United States Patent
Itoh et al.

(10) Patent No.: US 7,835,615 B2
(45) Date of Patent: Nov. 16, 2010

(54) DATA PROCESSING APPARATUS

(75) Inventors: Masanori Itoh, Moriguchi (JP); Hiroshi Yahata, Kadoma (JP)

(73) Assignee: Panasonic Corporation, Osaka (JP)

( * ) Notice: Subject to any disclaimer, the term of this patent is extended or adjusted under 35 U.S.C. 154(b) by 1082 days.

(21) Appl. No.: 11/247,623

(22) Filed: Oct. 11, 2005

(65) Prior Publication Data

US 2006/0077775 A1    Apr. 13, 2006

(30) Foreign Application Priority Data

Oct. 12, 2004    (JP)    ............... 2004-297435

(51) Int. Cl.
*H04N 7/00*    (2006.01)
(52) U.S. Cl. ...................................... 386/46
(58) Field of Classification Search ............. 386/111, 386/125–126, 95, 45, 33, 68, 70
See application file for complete search history.

(56) References Cited

U.S. PATENT DOCUMENTS

| | | | | |
|---|---|---|---|---|
| 5,751,887 | A * | 5/1998 | Nitta et al. ................... | 386/68 |
| 5,949,953 | A | 9/1999 | Shirakawa et al. | |
| 6,078,727 | A | 6/2000 | Saeki et al. | |
| 6,553,180 | B1 * | 4/2003 | Kikuchi et al. ............... | 386/95 |
| 6,580,869 | B1 * | 6/2003 | Ando et al. ................... | 386/68 |
| 7,065,290 | B2 * | 6/2006 | Yoshimura et al. ............ | 386/94 |
| 2001/0010664 | A1 | 8/2001 | Ando et al. | |
| 2002/0131761 | A1 | 9/2002 | Kawasaki et al. | |
| 2004/0114908 | A1 | 6/2004 | Ito | |

FOREIGN PATENT DOCUMENTS

| | | |
|---|---|---|
| EP | 1 463 340 A2 | 9/2004 |
| JP | 11-155130 | 6/1999 |
| WO | 02/080541 A1 | 10/2002 |

OTHER PUBLICATIONS

Notice for Reasons of Rejection for corresponding Japanese Application No. 2005-294700 issued Jul. 6, 2010 with partial English translation.

* cited by examiner

*Primary Examiner*—Thai Tran
*Assistant Examiner*—Tat Chio
(74) *Attorney, Agent, or Firm*—Renner, Otto, Boisselle & Sklar, LLP

(57) ABSTRACT

A data processing apparatus includes an encoder and a processor. The encoder generates reproduction units each including I/B/P picture data, and information indicating reproduction time to reproduce each of the pictures to generate a data stream. The processor generates, in accordance with the type of the recording medium, one of basic picture information and reproduction unit information, and time length information. Such information is stored in one or more tables of the respective units as management information. The basic picture information defines a correspondence between a reproduction time to reproduce the first I picture which is recorded at the top of the each unit, and a recording position of the I picture. The reproduction unit information defines a correspondence between a reproduction time length of each unit and a recording position of the I picture. The time length information relates to the reproduction time length on pictures in each unit.

12 Claims, 21 Drawing Sheets

| PID | Type of Stream |
|---|---|
| Video PID | ISO/IEC 13818-2 |
| Audio PID | ISO/IEC 13818-3 |
| PID of PCR | PCR |
| PID of PMT | PMT |
| ------ | ------ |

DATA PROCESSING APPARATUS

BACKGROUND OF THE INVENTION

1. Field of the Invention

The present invention relates to a technology for recording encoded video/audio data on a storage medium such as an optical disk, a hard disk, a memory card or the like, and reproducing the recorded video/audio data.

2. Description of the Related Art:

In order to compress video data at a low bit rate, the MPEG-2 standard (ISO/IEC 13818-1) provides three types of streams, i.e., a program stream, a transport stream, and a PES (Packetized Elementary Stream).

Such a system stream is, for example, written on an optical disk and stored thereon. An optical disk is a storage medium of video data replacing a magnetic tape. As optical disks, phase change optical discs including DVD-RAM discs and Blu-ray discs, and magneto-optic discs including MO discs are known.

For example, as a format for recording video data on a DVD-RAM disc, VIDEO RECORDING format (DVD Specifications for Rewritable/Re-recordable Discs Part 3 VIDEO RECORDING Version 1.0 September 1999) is provided. According to this format, a video data file is recorded on a DVD-RAM disc in the MPEG-2 program stream format.

A format for recording video data on a Blu-ray disc has also been provided. According to this standard, a video data file is recorded in the MPEG-2 transport stream format provided in ISO/IEC 13818-1. In a transport stream, video data is compressed by the MPEG-2 system provided in ISO/IEC 13818-2, and audio data is compressed by, for example, the MPEG-2-AAC (Advanced Audio Coding) system provided in ISO/IEC 13818-7.

FIG. 1 shows a data structure of video data which is recorded on a phase change optical disc 131 on a real time basis. In FIG. 1, the phase change optical disc 131 includes 2 kilobyte sectors. A group of each 16 sectors is treated as one logical block. Each logical block is provided with an error correction code, and is recorded on the phase change optical disc 131. This data structure is disclosed in, for example, Japanese Laid-Open Patent Publication No. 11-155130.

A physically continuous logical block having a data size of at least a predetermine time period (for example, data of 11 seconds when converted at the maximum recording/reproduction rate) is saved as one continuous data area. In this area, unit video packets (Video OBject UNITs: hereinafter, a Video OBject UNIT will be referred to as a "VOBU"), each including an MPEG transport stream of 0.4. to 1 second, are sequentially recorded.

One VOBU includes a plurality of 188-byte transport packets, which are at a lower level of an MPEG transport stream. The transport packet is available in four types, i.e., a video transport packet (V_TSP) having compressed video data stored therein, an audio transport packet (A_TSP) having compressed audio data stored therein, a transport packet (PAT_TSP) having a program association table packet (PAT) stored therein, and a transport packet (PMT_TSP) having a program map table (PMT) stored therein.

One VOBU includes V_TSPs regarding pictures which are reproduced over a predetermined period. One VOBU also includes all A_TPSs including audio frames required in relation to the video reproduction. Namely, audio frames are completed in one VOBU. The data size of one VOBU changes within a range of the maximum recording/reproduction rate when the bit rate of the video data is variable; whereas the data size of one VOBU is substantially constant when the bit rate of the video data is fixed.

FIGS. 2A through 2E respectively show, in detail, a V_TSP without a PCR, an A_TSP, a PAT_TSP, a PMT_TSP, and a V_TSP with a PCR. A V_TSP includes a transport packet header and video data. An A_TSP includes a transport packet header and audio data. A PAT_TSP mainly includes a transport packet header and a program association table. A PMT_TSP mainly includes a transport packet header and a program map table. As shown in FIG. 2E, when a PCR (program clock reference) is added to a V_TSP, a PCR value is recorded in an adaptation field adjacent to the transport packet header.

The V_TSP, the A_TSP, the PAT_TSP, and the PMT_TSP are identified by a PID (Packet ID) included in the respective transport packet header. For example, as shown in FIGS. 2A through 2D, the PID of the V_TSP is "0x0020", the PID of the A_TSP is "0x0021", the PID of the PAT_TSP is "0x0000", and the PID of the PMT_TSP is "0x0030". Once the PID value is detected, the type of the packet is identified.

The PIDs assigned to the V_TSP and the A_TSP are described in the program map table in the PMT_TSP. The PID assigned to the PMT_TSP is described in the program association table in the PAT_TSP. The PID of the PAT_TSP is fixed to "0x0000".

A PCR is a 27 MHz clock sample value, which indicates the time when the corresponding transport packet reached a virtual MPEG decoder. The MPEG-2 standard (ISO/IEC 13818-1) regulates that a PCR should be inserted to a transport packet having a specific PID at an arbitrary interval equal to or less than 100 msec.

In a PCR_PID field of the PMT, the PID of which has been selected for describing the PCR is recorded. An apparatus which has received a stream inputs this PCR value to the 27 MHz clock to provide a PLL (Phase Locked Loop). The apparatus also uses the PCR value to obtain a reference presentation time stamp (PTS) and a reference decoding time stamp (DTS). Namely, the apparatus sets the PCR value as the initial value of the 27 MHz clock, and thereafter inputs the PCR value to the PLL to use the PCR value as the clock on the transmission side. The apparatus decodes video data at the timing when the clock value matches the decoding time stamp (DTS) or the presentation time stamp (PTS) included in the video data, and displays a video based on the video data. Audio data is different from the video data in including only a PTS. Like in the case of video data, audio data is decoded and output at the timing when the clock value matches the PTS.

When one continuous data area becomes close to full of data, the apparatus detects the next continuous data area. When the one continuous data area becomes full, data is written in the next continuous data area.

FIG. 3 shows an example of data on an optical disc which is managed by the UDF (Universal Disc Format) file system. In FIG. 3, one MPEG transport stream is recorded as a file MOVIE.MPG by turning the recording start button on once and off once.

As shown in FIG. 3, the file names and the position of a file entry are managed by an FID (File Identifier Descriptor). One file and three continuous data areas a, b and c included in that file are managed by an allocation descriptor in the file entry.

The file is recorded in three data areas as follows. When the apparatus detects a defective logical block while recording data on the continuous data area a, the apparatus skips the defective logical block and resumes recording the data from the start of the continuous data area b.

When the apparatus detects a recording area of a PC file while recording data on the continuous data area b, the apparatus skips the recording area of the PC file and resumes recording the data from the start of the continuous data area c. As a result, the file MOVIE.MPG includes three data areas a, b and a.

FIG. 4 shows the relationship among a VOBU, transport packets thereof, a video elementary stream and an audio elementary stream. In this example, one VOBU includes M number of GOPs (Group of Pictures).

Each of video and audio frames includes a PES header. One VOBU includes a sequence header at the start thereof. Each GOP includes a GOP header.

In each VOBU, the first video PES header and the first audio PES header are adjusted to commence at the start of the payload of the respective transport packet. Specifically, padding data is inserted into the immediately previous transport packet, so that the size of the respective transport stream is adjusted.

A PAT_TSP and a PMT_TSP respectively include PIDs of the packets having video data or audio data. Accordingly, unless these two PIDs are recognized, the video and the audio cannot be reproduced.

In order to control the decoding timing and the output timing based on the PTS and DTS at the time of decoding, it is necessary to initialize the value of the 27 MHz clock at the earliest possible time. In order to realize this, it is necessary that the MPEG decoder should receive the PCR value as soon as possible and start using the clock value.

A specific structure for recording the above-described video data and audio data on a phase change optical disc is described in, for example, International Publication WO02/080541.

The MPEG-2 standard (ISO/IEC 13818-1) does not provide the timing to insert a PAT_TSP, a PMT_TSP or a PCR. The frequency of inserting the PCR is provided, but the frequency of inserting the PAT_TSP or PMT_TSP is not provided.

Most of reproduction apparatuses for reproducing the video recorded on a disc have a function of reproducing specific scenes of the video in an order favored by the user. For reproducing the video from a specific scene, the reproduction of the video data is generally started from the start of the sequence header.

In general, however, the timing to insert the PAT_TSP, the PMT_TSP or the PCR with respect to a V_TSP including the start of the sequence header used as a reproduction start point is not provided. Even if the apparatus reads the data from the start of the sequence header, the V_TSP or the A_TSP cannot be recognized by referring to the PID thereof unless the PAT_TSP and the PMT_TSP are detected. Accordingly, the decoding cannot be performed until the PAT_TSP and the PMT_TSP are detected.

As described above, when, for example, the I picture immediately after the sequence header is not recognized because the PAT_TSP and the PMT_TSP are undetected, the video cannot be displayed until the next sequence header. As a result, typically, neither video data nor audio data is output for about 0.5 to 1.0 second.

For reproducing specific scenes while sequentially switching the specific scenes, the PIDs registered in the PAT_TSP and the PMT_TSP may be different scene by scene. The descriptor information included in the PAT_TSP and the PMT_TSP may be different scene by scene. Therefore, appropriate PAT_TSP and PMT_TSP need to be transferred to the MPEG decoder at the earliest possible time at least scene by scene.

Especially when data is transferred to an STB (set top box) or a DTV (digital TV) connected by the IEEE1394 interface using the transfer protocol of the SIO-61883 transport stream, transfer of the PAT_TSP, the PMT_TSP and the PCR is important. The reason is that there is no means for transferring, for example, the used PIDs and PCR values separately from the transport stream.

When reproducing data using the MPEG decoder of an apparatus, it is conceivable to transfer, for example, the used PIDs and PCR values in the state of being converted into a different data structure using a different return path from the path used for the MPEG stream (for example, via a CPU connected to the MPEG decoder).

However, in order to transfer information necessary for each scene by the different path, it is necessary to record information on the PID and information on the first PCR value of each VOBU at the time of recording and to transfer such information to the MPEG decoder before one scene is switched to the next scene. Such a method requires the PID and the PCR value of each VOBU to be recorded as management data, which enlarges the data capacity. In addition, such a method causes a processing delay. Therefore, this method is not sufficient for using the MPEG decoder of the apparatus to reproduce the video and simultaneously output the video signal to the IEEE1394 interface and also for displaying exactly the same video at both of the output destinations.

Conventionally, there is also a problem in reproducing a stream accumulated on a hard disc of a PC using an MPEG reproduction application operable on the PC. Specifically, when the video reproduction is to be started from a specific scene, if the PAT_TSP, the PMT_TSP and the PCR are recorded from the middle of the scene, the video is displayed from the position after the scene at which the first sequence header is detected. In order to avoid this, it is necessary to detect the PAT_TSP, the PMT_TSP and the PCR inserted after the data corresponding to the reproduction start point and then return to the reproduction start point to start the reproduction. This delays the reproduction and scene switching.

Conventionally, there is further a problem in copying or dubbing an MPEG stream to another recording medium. Specifically, when the data structure of management information of an MPEG stream needs to be converted, it is necessary to analyze the MPEG stream of, for example, each VOBU, and generate management information recordable on the storage medium to which the data is to be copied or dubbed. This possibly requires an enormously long processing time. This problem occurs also in transferring the MPEG stream on the recording medium, from which the data is to be copied or dubbed, with no conversion.

SUMMARY OF THE INVENTION

In order to overcome the problems described above, preferred embodiments of the present invention provide an apparatus and method capable of easily reproducing all the frames in a specified range even when the reproduction start point is in the middle of a file, and of capable of allowing the same frames to be reproduced by an apparatus connected to the apparatus via a 1394 interface.

The preferred embodiments of the present invention also allow management information to be generated in a format appropriate to any of various recording mediums having different formats of management information with no need to analyze the data stream, and thus allow high speed transfer of the data stream and the management information.

A data processing apparatus according to the present invention preferably includes an encoder for encoding a video signal to generate a data stream; a processor for generating management information for reproducing video from the data stream; and a drive for writing the data stream and the management information on a storage medium. The encoder generates a plurality of reproduction units each including data of a basic picture capable of being decoded independently, data of at least one reference picture required to be decoded from the basic picture, and time information indicating a reproduction time to reproduce each of the pictures, aligns the plurality of reproduction units and thus generates the data stream. The processor generates, in accordance with type and recording format of the recording medium, one of basic picture information and reproduction unit information, and time length information, and stores each generated information in one or more tables of the respective reproduction units as management information. The basic picture information preferably defines a correspondence between a reproduction time to reproduce the first basic picture which is recorded at the top of the each reproduction unit, and a recording position of the basic picture. The reproduction unit information preferably defines a correspondence between a reproduction time length of each reproduction unit and a recording position of the basic picture. The time length information preferably relates to the reproduction time length on pictures in each reproduction unit.

In one preferred embodiment of the present invention, an order in which the data of the pictures is arranged may be different from an order in which the pictures are displayed due to the encoding. The encoder preferably may output information specifying at least one reference picture, the data of which is arranged after the first basic picture in each reproduction unit and is displayed before the first basic picture. The processor may generate the time length information on the reproduction time length of the specified at least one reference picture, and stores the time length information in the one or more tables of the respective reproduction units.

In this particular preferred embodiment, the processor may generate a first flag specifying one of the basic picture information and the reproduction unit information, and generate a second flag indicating that the time length information is stored, and store the first flag and the second flag in the one or more tables of the respective reproduction units.

In another preferred embodiment, the data processing apparatus may further include a converting section for converting a format of the management information. When the processor generates the basic picture information, the converting section may further generate the reproduction unit information based on the basic picture information and the time length information.

In still another preferred embodiment, the converting section may replace the reproduction unit information with the basic picture information to generate new management information.

In yet another preferred embodiment, the data processing apparatus may further include an interface section for performing data communication with an external device. The interface section may output the new management information and the data stream to the external device.

In another preferred embodiment, the data processing apparatus may further include a converting section for converting a format of the management information. When the processor generates the reproduction unit information, the converting section may further generate the basic picture information based on the reproduction unit information and the time length information.

In this particular preferred embodiment, the converting section may replace the basic picture information with the reproduction unit information to generate new management information.

In yet another preferred embodiment, the data processing apparatus may further include an interface section for performing data communication with an external device. The interface section may output the new management information and the data stream to the external device.

A data processing method according to the present invention is preferably a method of writing a data stream of video and management information for reproducing the video from the data stream on a storage medium. The method preferably includes the steps of: encoding a video signal to generate a plurality of reproduction units each including data of a basic picture capable of being decoded independently, data of at least one reference picture required to be decoded from the basic picture, and time information indicating a reproduction time to reproduce each of the pictures; aligning the plurality of reproduction time units to generate the data stream; generating, in accordance with type and recording format of the recording medium, one of basic picture information and reproduction unit information, and time length information; storing each generated information in one or more tables of the respective reproduction units as management information; and writing the data stream and the management information on the storage medium. The basic picture information preferably defines a correspondence between a reproduction time to reproduce the first basic picture which is recorded at the top of the each reproduction unit, and a recording position of the basic picture. The reproduction unit information preferably defines a correspondence between a reproduction time length of each reproduction unit and a recording position of the basic picture. The time length information preferably relates to the reproduction time length on pictures in each reproduction unit.

A circuit chip according to the present invention preferably includes an encoder for encoding a video signal to generate a data stream; and a processor for generating management information for reproducing video from the data stream. The circuit chip preferably instructs a drive to write the data stream and the management information on the storage medium. The encoder preferably generates a plurality of reproduction units each including data of a basic picture capable of being decoded independently, data of at least one reference picture required to be decoded from the basic picture, and time information indicating a reproduction time to reproduce each of the pictures, aligns the plurality of reproduction units and thus generates the data stream. The processor preferably generates, in accordance with type and recording format of the recording medium, one of basic picture information and reproduction unit information, and time length information, and stores each generated information in one or more tables of the respective reproduction units as management information. The basic picture information preferably defines a correspondence between a reproduction time to reproduce the first basic picture which is recorded at the top of the each reproduction unit, and a recording position of the basic picture. The reproduction unit information preferably defines a correspondence between a reproduction time length of each reproduction unit and a recording position of the basic picture. The time length information preferably relates to the reproduction time length on pictures in each reproduction unit.

A product of a computer program according to the present invention is preferably executable by a computer and used for generating a data stream of video and management information for reproducing the video from the data stream. The computer program preferably causes the computer to execute the steps of: encoding a video signal to generate a plurality of reproduction units each including data of a basic picture capable of being decoded independently, data of at least one reference picture required to be decoded from the basic picture, and time information indicating a reproduction time to reproduce each of the pictures; aligning the plurality of reproduction time units to generate the data stream; generating, in accordance with type and recording format of the recording medium, one of basic picture information and reproduction unit information, and time length information; storing each generated information in one or more tables of the respective reproduction units as management information; and writing the data stream and the management information on the storage medium. The basic picture information preferably defines a correspondence between a reproduction time to reproduce the first basic picture which is recorded at the top of the each reproduction unit, and a recording position of the basic picture. The reproduction unit information preferably defines a correspondence between a reproduction time length of each reproduction unit and a recording position of the basic picture. The time length information preferably relates to the reproduction time length on pictures in each reproduction unit.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, Embodiments 1 through 7 of a data processing apparatus according to the present invention will be described with reference to the accompanying drawings. Especially important processing, data structure and the like according to the present invention will be described in Embodiment 6 and 7.

Embodiment 1

Figure 1:
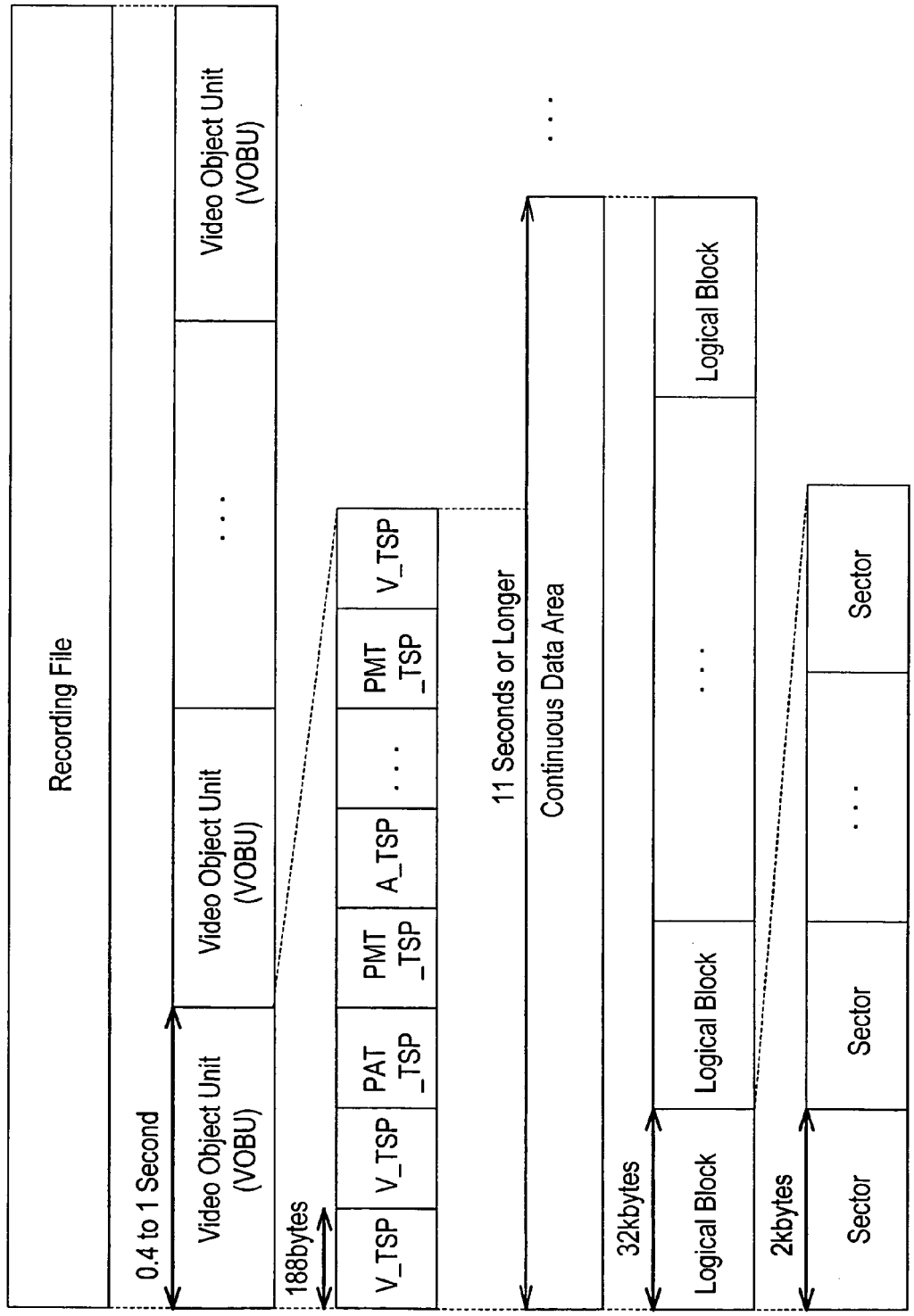
FIG. 1 shows a data structure of a recording file.
Figure 2A:
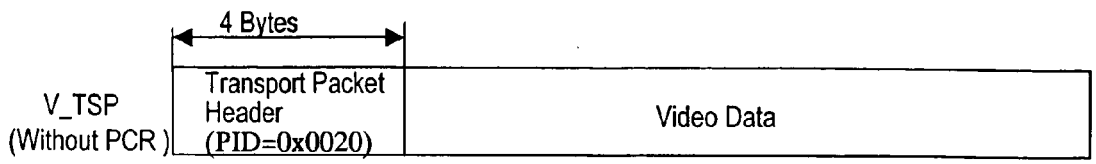
FIGS. 2A through 2E show data structures of various types of transport packets.
Figure 2B:
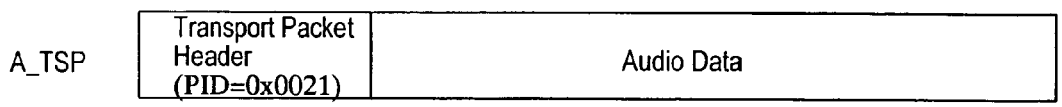
Figure 2C:
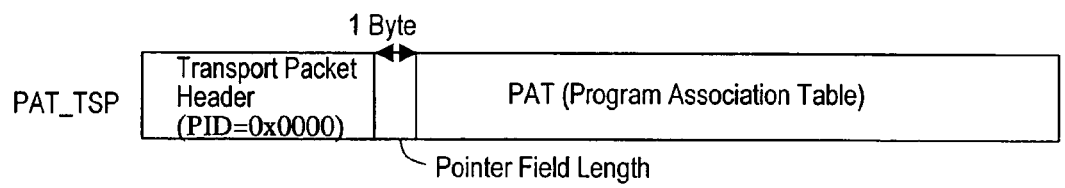
Figure 2D:
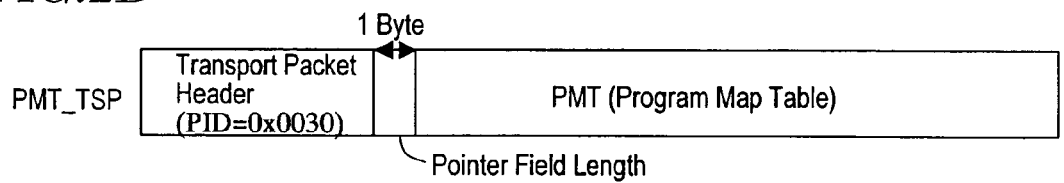
Figure 2E:
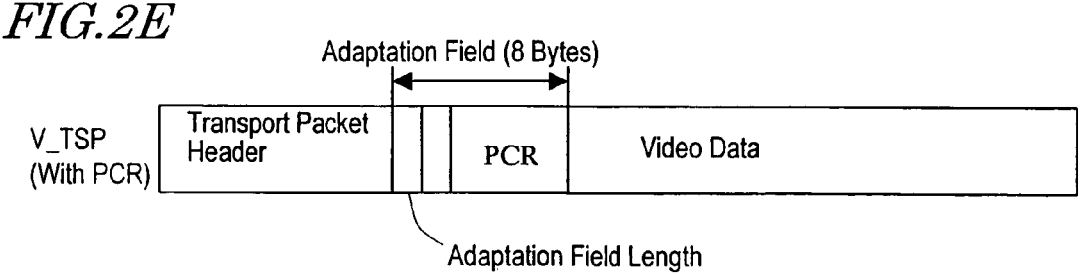
Figure 3:
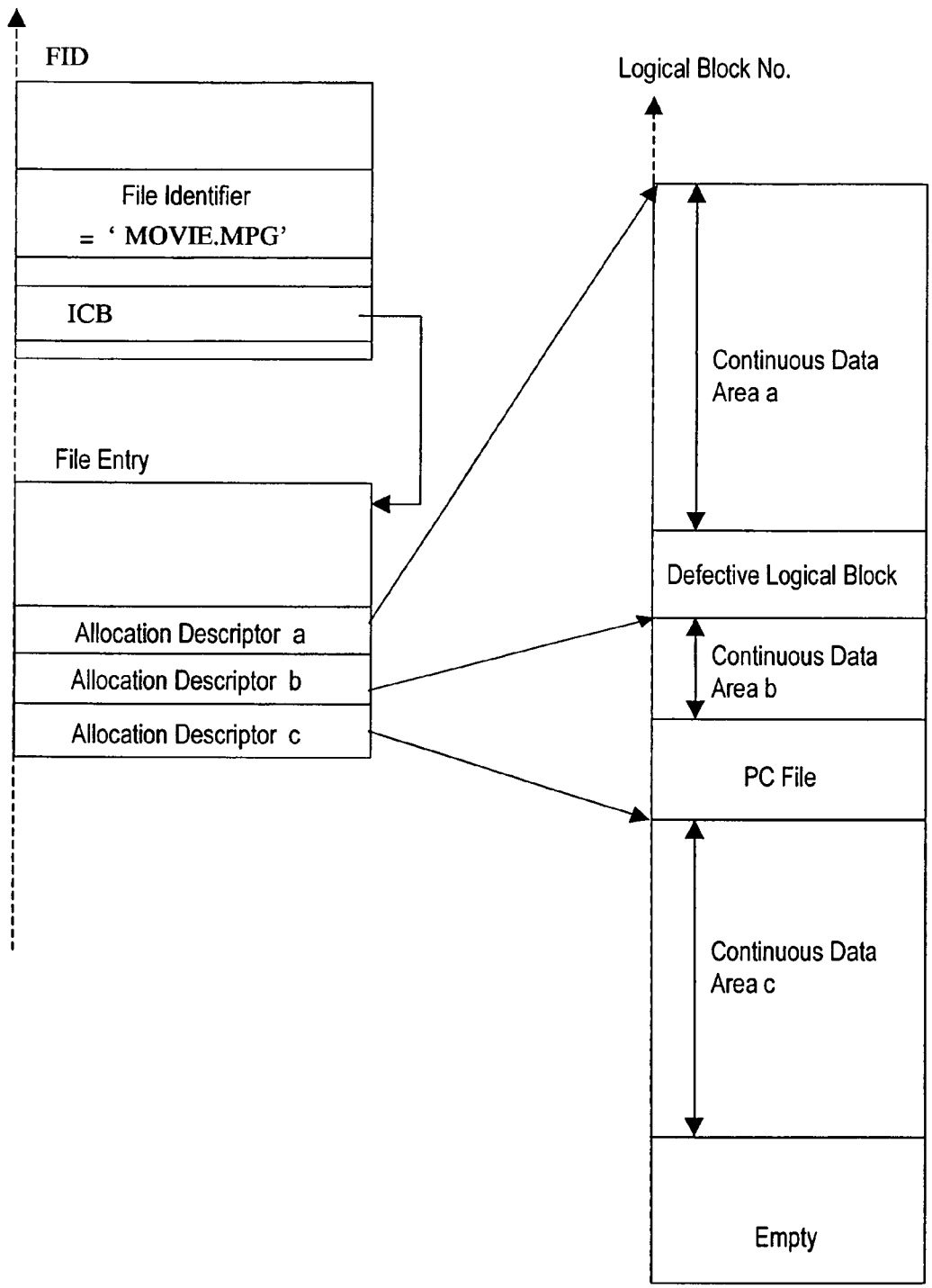
FIG. 3 shows an example of data on an optical disc managed by the UDF file system.
Figure 4:
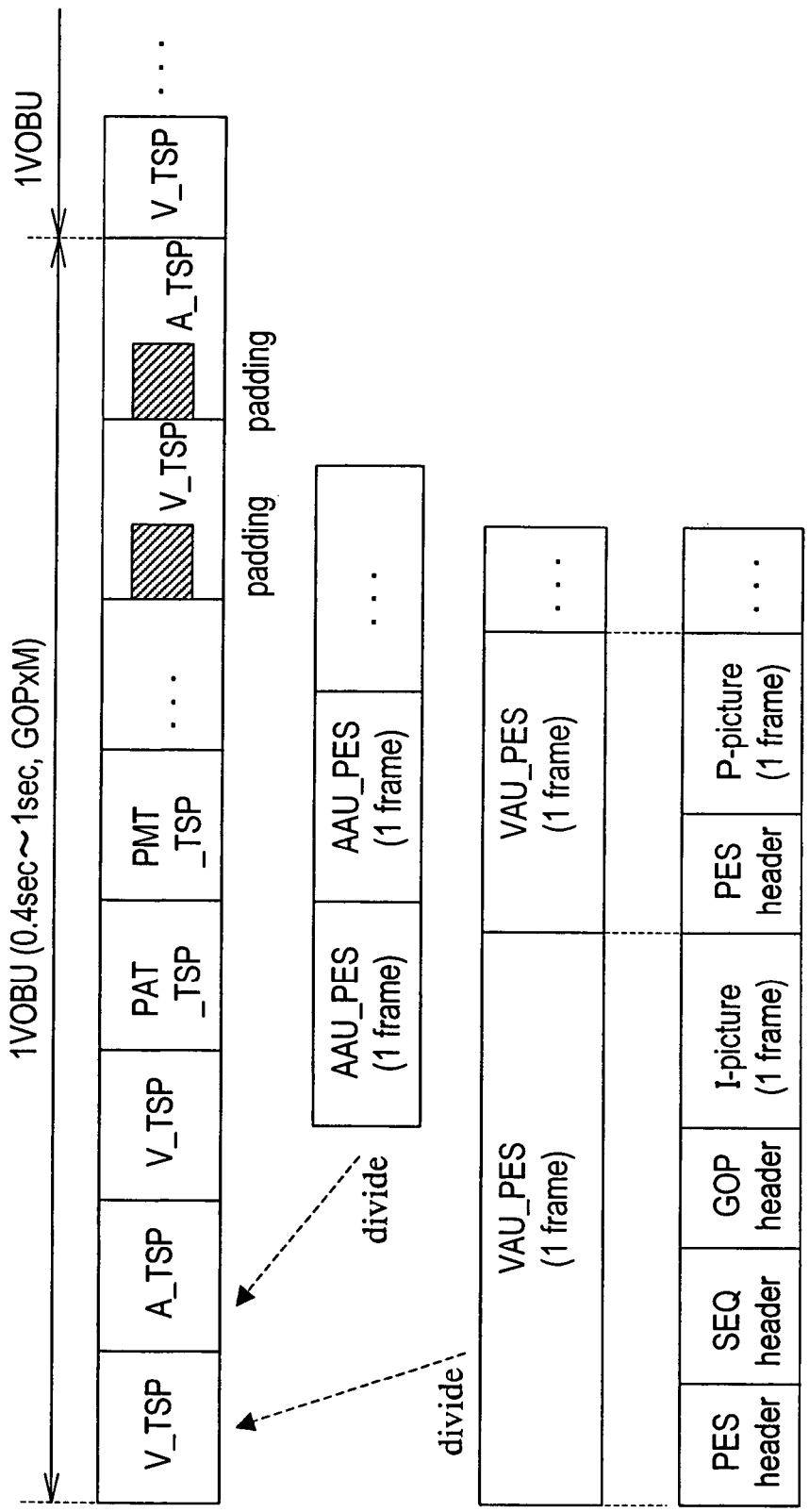
FIG. 4 shows the relationship among a VOBU, transport packets thereof, a video elementary stream and an audio elementary stream.
Figure 5:
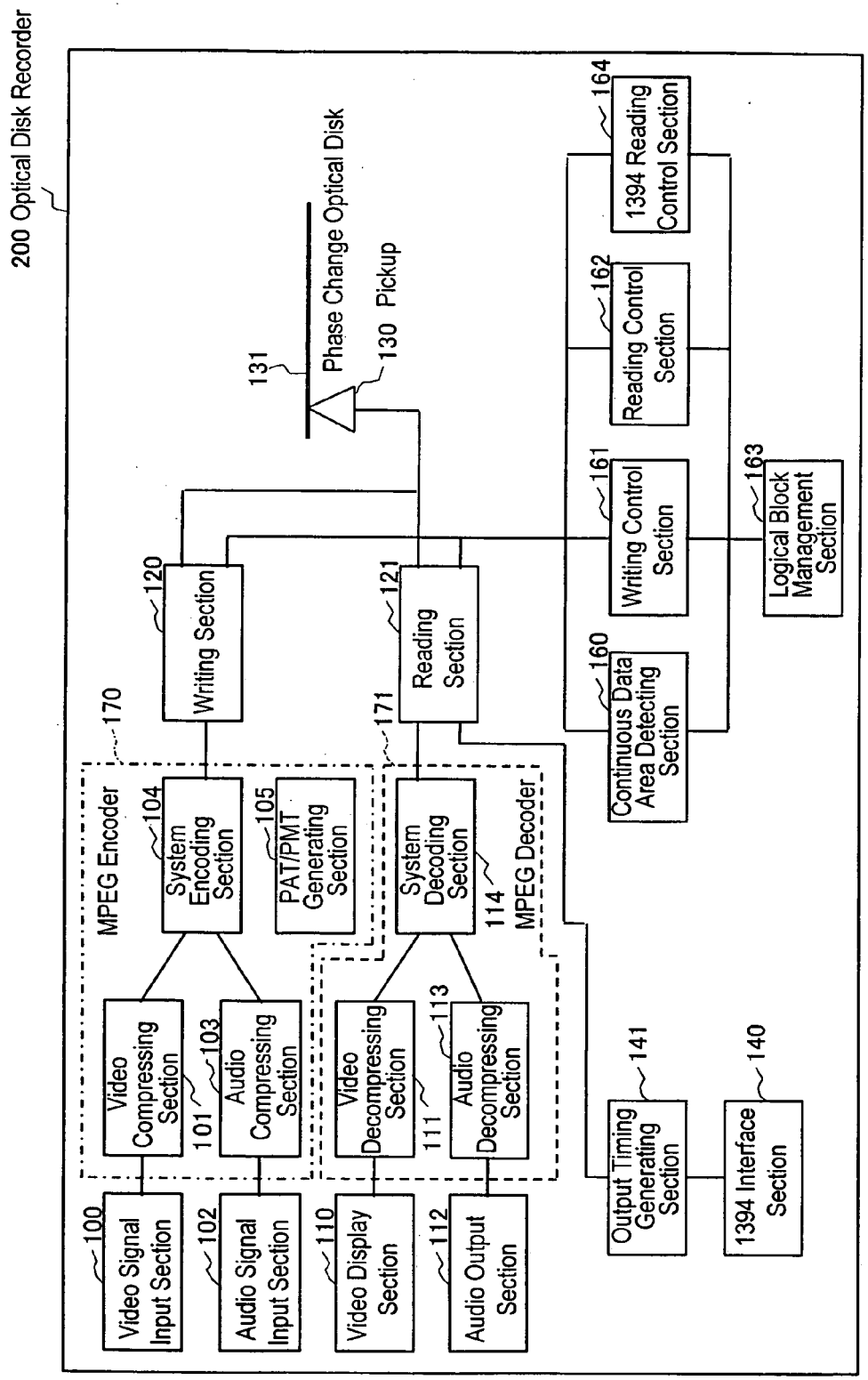
FIG. 5 is a block diagram showing a structure of an optical disc recorder 200 according to Embodiment 1 of the present invention.

FIG. 5 shows a structure of an optical disc recorder 200 (hereinafter, referred to as the "recorder 200") according to Embodiment 1 of the present invention. The recorder 200 processes an MPEG-2 transport stream (hereinafter, referred to as a "transport stream"). For recording a video signal and an audio signal, the video signal input from a video signal input section 100 is compressed by a video compressing section 101, and the audio signal input from an audio signal input section 102 is compressed by an audio compressing section 103. A packet including a PAT generated by a PAT/PMT generating section 105 and a packet including a PMT generated by the PAT/PMT generating section 105 are mixed to the compressed video and audio signals by a system encoding section 104 to generate a transport stream. The transport stream is transmitted via a writing section 120 and a pickup 130, and is written on a phase change optical disc 131. This processing is performed while the recorder 120 receives a video signal and an audio signal; namely, the recording processing is performed in parallel with signal receiving. Therefore, this recording processing is referred to as "real time recording". The video compressing section 101, the audio compressing section 103, the system encoding section 104, and the PAT/PMT generating section 105 are included in an MPEG encoder 170.

For reproducing a video signal and an audio signal, a transport stream taken out after being transmitted via the pickup 130 and a reading section 121 is separated into a video signal and an audio signal by a system decoding section 114. The video signal is output to a video display section 110 via a video decompressing section 111, and the audio signal is output to an audio display section 112 via an audio decompressing section 113. The video decompressing section 111, the audio decompressing section 113, and the system decoding section 114 are included in an MPEG decoder 171.

For recording the video signal and the audio signal, a writing control section 161 controls the writing section 120, a continuous data area detecting section 160 and a logical block management section 163 to perform the recording. In response to an instruction from the writing control section 161, the continuous data area detecting section 160 checks the state of use of sectors managed by the logical block management section 163 and detects a physically continuous empty area.

For reproducing the video signal and the audio signal, a reading control section 162 controls the reading section 121 to perform the reproduction.

For outputting the recorded video file to an external element via an 1394 interface section 140 by the Isochronous transfer mode, the timing to output the transport stream which has been read via the reading section 121 is obtained by a transport stream output timing generating section 141, and the transport stream is output to the 1394 interface section 140 at the obtained output timing.

An apparatus according to this embodiment has one major feature in the timing at which the system encoding section 104 inserts a PAT_TSP, a PMT_TSP and a PCR.

Figure 6:
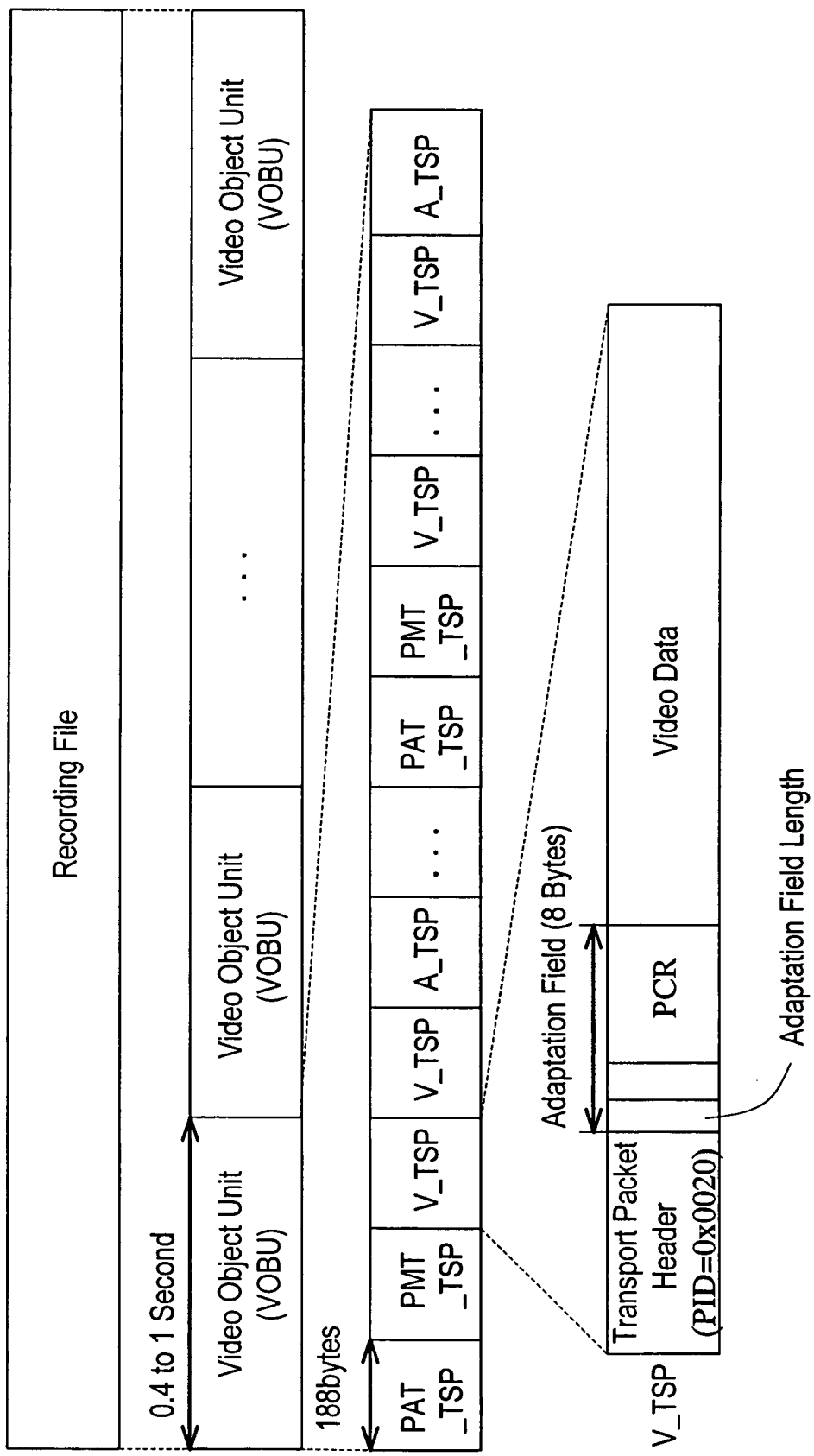
FIG. 6 shows a data structure of a recording file recorded by the recorder 200.

FIG. 6 shows a data structure of a recording file recorded by the recorder 200. The recording file includes a known VOBUs except for the recording positions of the PAT_TSP and the PMT_TSP.

In FIG. 6, a PAT_TSP and a PMT_TSP are located at the start of each VOBU necessarily. A V_TSP having a PCR is located in the next transport packet. In a VOBU, a PAT_TSP and a PMT_TSP are inserted so as to be recorded at an interval equal to or less than 100 msec. in accordance with the standards of the Japanese BS digital broadcast and the European digital broadcast (DVB). Specifically, a PAT_TSP and a PMT_TSP are recorded at a frequency of once in 2 to 3 frames. In a VOBU, a PCR is also recorded at an interval equal to or less than 100 msec. in accordance with the MPEG-2 standard (ISO/IEC 13818-1).

With the above-described structure, when the reproduction start point which can be set by the user is the start of each VOBU, the start of whichever VOBU may be designated, a PAT_TSP and a PMT_TSP are necessarily included at the start of the VOBU. Therefore, for all the transport packets subsequent thereto, the system decoding section 114 can easily identify the video data and the audio data, and thus can easily distinguish which data is to be sent to the video decompressing section 111 and which data is to be sent to the audio decompressing section 113 for reproduction and display. Therefore, all the frames designated at the reproduction start time and at the time of scene switching can be displayed without missing. In addition, since the PCR arrives before the DTS and PTS added to the video, the MPEG decoder 171 can reproduce and display the data using (referring to) the DTS or PTS.

In the case where a transport stream is output to an external device via the 1394 interface section 140, the start of whichever VOBU may be designated as the reproduction start point by the user, a transport stream including a PAT_TSP and a PMT_TSP as the first packets can be easily output.

In this embodiment, the files are managed by the UDF file system. Substantially the same effects are provided even when the files are managed by the FAT or other uniquely developed file systems.

In this embodiment, a PAT_TSP and a PMT_TSP in a VOBU are recorded at a frequency of at least once in 100 msec. Alternatively, the PAT_TSP and the PMT_TSP may be inserted at a different frequency in accordance with the other standards.

In this embodiment, a PCR is included in the first V_TSP of a VOBU. Alternatively, a transport packet formed of only a PCR may be recorded between the first V_TSP and the first PMT_TSP in the VOBU. The PID of such a transport packet may be the same as, or different from, the PID of the V_TSP.

Embodiment 2

In Embodiment 1, a transport stream is generated and recorded, or reproduced, in the recording 200, while a transport packet is output to an external element concurrently.

In this embodiment, unlike in Embodiment 1, a transport stream input from an external element is recorded and then output to an external element.

Figure 7:
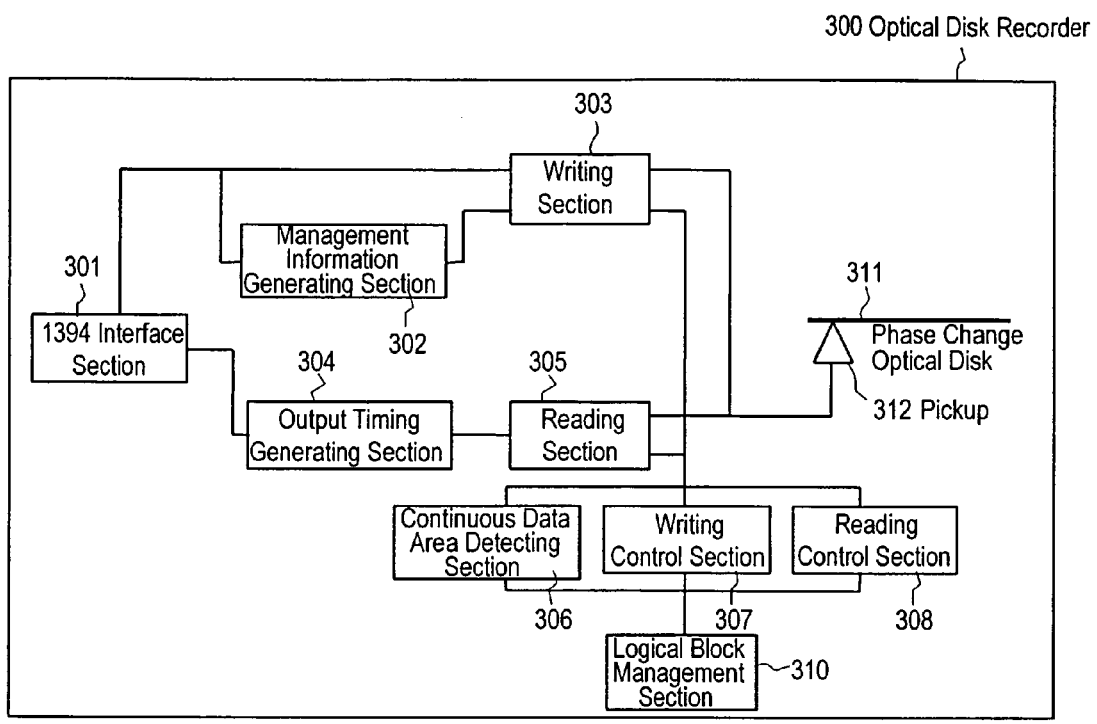
FIG. 7 is a block diagram showing a structure of an optical disc recorder 300 according to Embodiment 2 of the present invention.

FIG. 7 is a block diagram of an optical disc recorder 300 (hereinafter, referred to as the "recorder 300") according to this embodiment. In FIG. 7, for recording data, a transport stream is input from a 1394 interface section 301 and written on a phase change optical disc 311 vi a writing section 303 and a pickup 312. Concurrently, a writing control section 307 starts a continuous data area detecting section 306 to detect an empty continuous data area necessary for writing. A logical block management section 310 is notified by the writing control section 307 of Nos. of logical blocks used for writing and manages the state of use of logical blocks.

A management information generating section 302 detects, from the input transport stream, a V_TSP including a sequence header and a PES header immediately therebefore, a transport packet PAT_TSP including a PAT, and a transport packet PMT_TSP including a PMT. The management information generating section 302 then generates management information, which includes data size between V_TSPs having adjacent sequence headers, data size between the adjacent PES headers, and the reproduction time length. The reproduction time length is provided by the unit of the number of video frames. The data size of the I picture immediately after the sequence header is also provided as management information.

A transport packet including a PAT which was input most recently before a transport packet including a PMT, which was in turn input most recently before a V_TSP including a sequence header and a PES header was input, is found. Then, the data size between such a found transport packet and the transport packet including the sequence header and the PES header is also provided as management information by the unit of the number of transport packets.

The writing control section 307 starts the writing section 303 and writes the management information of the input transport packets on the phase change optical disc 311, and provides the management information as a management file.

For reproduction, a reading control section 308 reads a management file stored on the phase change optical disc 311 via the pickup 312 and a reading section 305. By referring to the management file based on the designated reproduction start time, the recording position of a corresponding MPEG Sequence Object Unit (hereinafter, referred to as an "SOBU") and the position of the corresponding PAT_TSP are found.

Data of the PAT_TSP, data of the first PMT_TSP included after the PAT_TSP, and data at and after the corresponding SOBU are read via the pickup 312 and the reading section 305. Namely, among the transport packets recorded between the PAT_TSP and the start of the corresponding SOBU, the transport packets except for the PAT_TSP and the PMT_TSP are not output. The SOBU will be described in detail later.

The data which has been read is output via an output timing generating section 304 and the 1394 interface section 301. The output timing generating section 304 performs buffer simulation of a transport stream target decoder (T_STD) provided by the MPEG-2 standard (ISO/IEC 13818-1) on the read data, and thus calculates an appropriate output timing. The output timing generating section 304 then transfers the read data to the 1394 interface section 301 at the calculated output timing. The 1394 interface section 301 outputs the transport packets while maintaining the timing.

Figure 8:
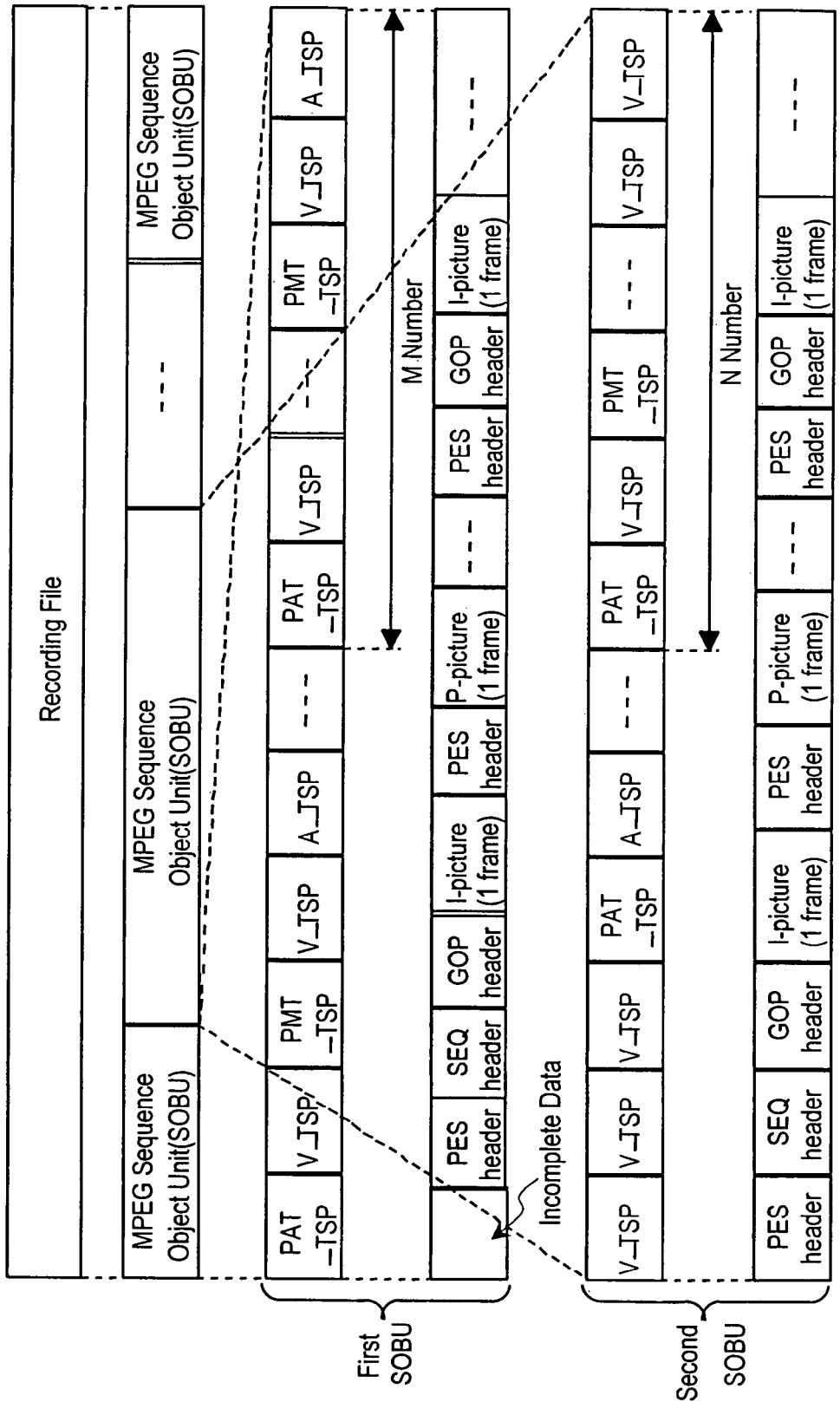
FIG. 8 shows a data structure of a recording file recorded by the recorder 300.

FIG. 8 shows a data structure of a recording file recorded by the recorder 300. As shown in FIG. 8, the recording file includes SOBUs.

In this specification, the terms "SOBU" and "VOBU" (FIG. 6) are used differently as follows. A "VOBU" refers to a video reproduction unit of a data stream generated by the recorder itself by encoding an analog signal. An "SOBU" refers to a video reproduction unit of a data stream which is written on a storage medium by the recorder and which substantially maintains the data structure of a transport stream received from an external element by the recorder. These terms are used differently for the sake of convenience. The present invention is not limited by the above-described definitions.

On principle, an SOBU extends from a V_TSP including a video sequence header and a PES header immediately therebefore to a position before a V_TSP including the next sequence header and a PES header immediately therebefore. The first SOBU exceptionally includes a PAT_TSP at the start thereof. The reason is that the recording starts with the PAT_TSP in Embodiment 2. Because of such a structure, incomplete data is included between the V_TSP including the first sequence header and the PAT_TSP. Each SOBU may include a plurality of GOPs.

In FIG. 8, the PAT_TSP immediately before the last PMT_TSP in the first SOBU is the M'th transport packet from the end of the SOBU. The second SOBU includes, at the start thereof, a V_TSP including a sequence header and a PES immediately therebefore. The PAT_TSP immediately before the last PMT_TSP in the second SOBU is the N'th transport packet from the end of the SOBU.

It should be noted that a V_TSP including a sequence header and a PES immediately therebefore does not need to include the PES header and the sequence header from the start of the data area thereof (hereinafter, referred to as the "payload"). The reason is that the start position of the sequence header of a transport stream input from an external element cannot be designated.

In an extreme case, for example, a sequence header can be bridged over two V_TSPs. In such a case, a V_TSP including the first byte (0x00), in a 4-byte sequence header code (0x000001B3) located at the start of the sequence header, is the first V_TSP in the SOBU.

Figures 9, 10:
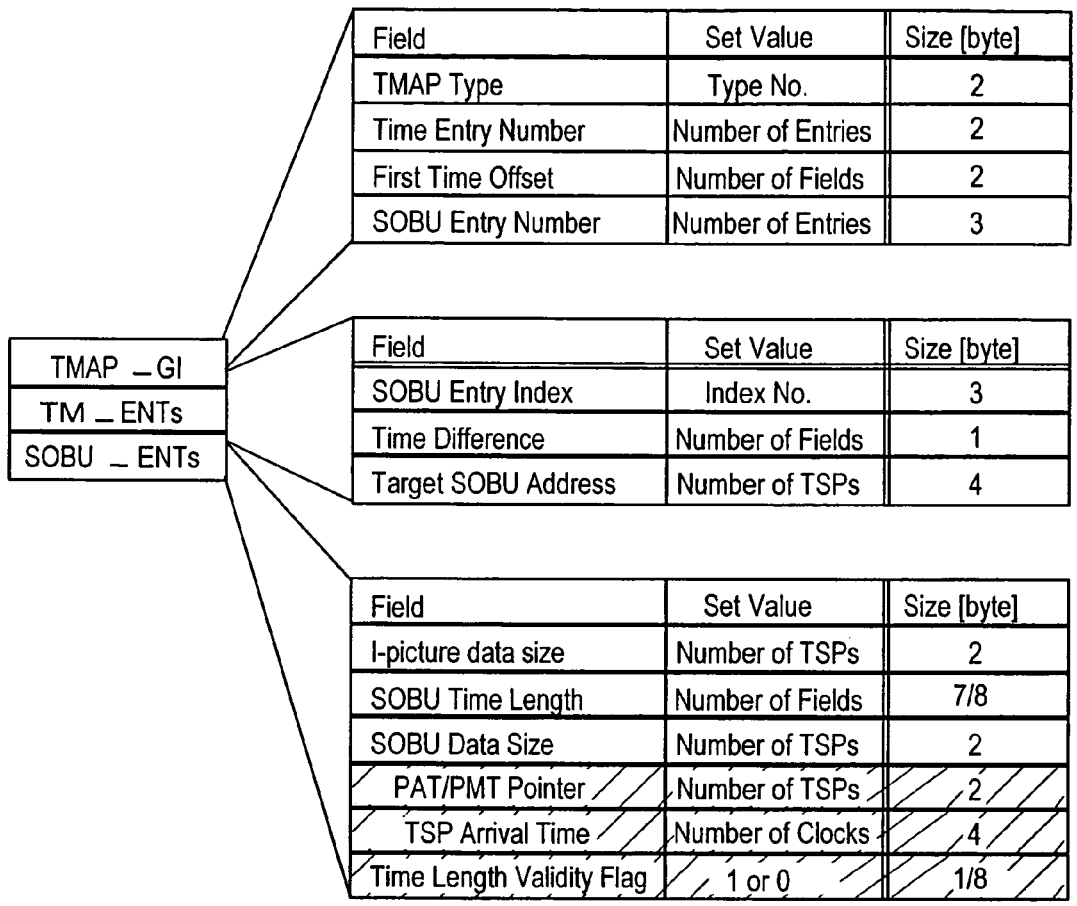
FIG. 9 shows a data structure of a management file recorded by the recorder 300.
FIG. 10 shows a data structure of management data provided in each group of continuous SOBUS.

FIG. 9 shows a data structure of a management file recorded by the recorder 300. As shown in FIG. 9, the management file includes a TMAP_PGI table, a plurality of TM_ENT tables (TM_ENTs), and a plurality of SOBU_ENT tables (SOBU_ENTs). These three types of tables maintain the relationship between the time period from time 0 (zero) which is the start of a file and the recording position of the transport packet corresponding to the time 0.

First, in the TMAP_GI table, a type No. is stored in a TMAP type field as an identifier of the data structure of the management file. The number of the TM_ENT tables is stored in a time entry field. The number of SOBU_ENT tables is stored in an SOBU entry number field. In a first time offset field, a time period between the first video frame in the file and the time which is referred to by the first TM_ENT table is stored as the number of fields.

Next, in each SOBU_ENT table, the data size of the I picture at the start of the SOBU is set in an I-picture data size field. This data size is described using the number of transport packets. The time length required for displaying the SOBU is set as the number of fields in an SOBU time length field. The data size of the SOBU is set in an SOBU data size field by the unit of the number of transport packets. The above-described structure is proximate to the conventionally known time map information.

The position of the PAT_TSP which was input most recently before the input of the last PMT_TSP in the immediately previous SOBU is set in a PAT/PMT pointer field, as the number of packets counted from the end of the immediately previous SOBU. The arrival time difference between the transport packets at the start of two continuous SOBUs is set in a TSP arrival time field using the counter value of a 27 MHz clock.

The time length information in the TSP arrival time field and the time length information in the SOBU time length field are compared with each other based on the same unit. When the two pieces of information is different by equal to or greater than 1.5 times (or by greater than 1.5 times), the value in a time length validity flag field is set to "0". When the two pieces of information is different by less than 1.5 times (or by equal to or less than 1.5 times), the value in the time length validity flag field is set to "1". When the time length validity flag is "1", it is indicated that the value in the SOBU time length field is valid, whereas when the time length validity flag is "0", it is indicated that the value in the TSP arrival time field is valid.

Each TM_ENT table stores the position on the recording file of a reference time provided at an interval of 10 seconds. Namely, an SOBU Entry Index field stores a serial number of the SOBU_ENT table of the SOBU corresponding to the reference time provided at an interval of 10 seconds. A Time Difference field stores a time difference between the video frame corresponding to the reference time provided at an interval of 10 seconds and the first frame of the SOBU referred to by the SOBU Entry Index, by the unit of the number of fields.

In the case of the recording file shown in FIG. 8, the PAT/PMT pointers in the SOBU_ENT tables corresponding to the first, second and third SOBUs respectively store "0" (zero), "M" and "N".

For recording data, a transport stream input via the 1394 interface section 301 is recorded to create a recording file, and a management file is concurrently created. It should be noted that the TM_ENTs and the TMAP_GI are created by referring to the SOBU_ENTs after the recording file and the SOBU_ENTs are created. When the time length validity flag is "0", the corresponding TM_ENT is created, considering the value in the TSP arrival time field as the time length of the corresponding SOBU.

For reproducing data, the management file is read in advance, and the SOBU_ENT table of the SOBU corresponding to the designated reproduction start time is detected by referring to the TM_ENT table. In addition, the PAT/PMT pointer in the corresponding SOBU_ENT is referred to, and thus the transport packets on the disc are read from the position of the PAT/PMT pointer and the necessary transport packets are output to an external element.

With the above-described structure, the data of the SOBU corresponding to the designated reproduction start time and thereafter can be output while including an appropriate PAT and an appropriate PMT. More specifically, even when the start of a specific SOBU is designated as the reproduction start time, all the data necessary for the reproduction of data at and after the specific SOBU can be output without any data missing. As a result, the necessary data can be output in a reproduceable form to an external device such as a DTV or an STB connected to the 1394 interface section 301 at any timing which is designated by the unit of SOBU.

For detecting the start of an SOBU, a V_TSP including the fourth byte of the sequence header code may be detected and management data may be created with such a V_TSP as the start of an SOBU. This method is simpler in terms of detection processing than the method of detecting a V_TSP including the first byte of the PES header immediately before the sequence header code and creating management data with such a V_TSP as the start of an SOBU. The reason is that with the latter method, when the sequence header or the immediately previous PES header is bridged over two V_TSPs, it is necessary to first detect the fourth byte of the sequence header and then calculate the start position of the SOBU by going back to the immediately previous V_TSP. Since the number of transport packets interposed between the two V_TSPs is not fixed, it is necessary to calculate the number of such transport packets each time. With the method according to this embodiment, the number of transport packets interposed between the two V_TSPs is 0 (zero) and it is not necessary to calculate the number of such transport packets each time.

In the case where the V_TSP including the fourth byte is the first V_TSP in the SOBU, it is necessary at the time of reproduction to output the V_STP including the first byte of the sequence header which exists between the PAT_TSP indicated by the PAT_PMT pointer and the start of the SOBU. Alternatively, it is necessary to newly generate and insert a V_TSP including the first byte of the sequence header. Still alternatively, when the start of the payload is 0xB3 in the MPEG decoder on the receiving side, it is necessary to reproduce data considering 0xB3 as the sequence start code.

As described above, the TSP arrival time field and the time length validity flag field are provided. Therefore, even in the case where the transport stream to be input is for special reproduction, the time interval can be maintained both for the time management performed by the SOBU by the unit slightly less than 1 second and for the time management performed by the TM_ENT at an interval of 10 seconds. A transport stream for special reproduction to be recorded is, for example, for slow reproduction having a display speed of about five frames per second. As such a transport stream, different types of pictures are sequentially input in the manner of IBBPBB . . . . In this case, the number of frames in an SOBU is "5", which corresponds to about ⅓ second. The TSP arrival time is 1 second. Even to such an input, the SOBU can be managed as an SOBU of 1 second, which is equal to the display time.

There is also a case where a transport stream for high speed reproduction has a display speed of about five frames per second. As such a transport stream, I pictures are sequentially input in the manner of IIII . . . . Even to such an input, the SOBU can be managed as an SOBU of 1 second, which is equal to the display time.

In this embodiment, the PAT/PMT pointer which was input most recently before the start of the SOBU during the recording is registered in the SOBU_ENT. Alternatively, the PAT/PMT pointer immediately after the SOBU may be stored. However, in this case, at the time of reproduction, it is necessary to output a transport packet with a value of the continuity counter obtained by subtracting "1" from the continuity counter of the PAT and PMT, to which the PAT/PMT pointer refers, before the SOBU is output. In the case where a program clock reference (PCR) field is included in the transport packet including the PAT or the PMT, it is also necessary to correct the PCR value such that the PCR value is reduced by the time period by which the above-identified transport packets are output before the SOBU is output. In the case where a PCR is included in the transport packet including the PAT or the PMT, it is desirable to separately output a transport including a PCR.

In this embodiment, the PAT/PMT pointer of the SOBU_ENT table is referred to for reproduction. It is not absolutely necessary to refer to the PAT/PMT pointer. It is also possible to read a predetermined amount of data immediately before the SOBU, perform a search from the start of the SOBU toward the transport packets which were input in the past, and output the PMT_TSP detected first and the PMT_TSP detected next before the SOBU is output. Especially in the case of a transport stream conformed to the digital broadcast standards, the frequency of insertion of the PAT_TSP and the PMT_TSP may be defined. In that case, it is sufficient to read a predetermined amount of data corresponding to the frequency of insertion is read. Such a predetermined amount of data necessarily includes the PAT_TSP and the PMT_TSP. For example, when a PAT_TSP and a PMT_TSP exist at an interval equal to or less than 100 msec. within a 15 Mbps stream, the predetermined amount of data is 187.5 kilobytes. In this case, needless to say, the time for searching for the packets is additionally required.

In this embodiment, the PAT/PMT pointer of the SOBU_ENT table is referred to for reproduction. It is not absolutely necessary to refer to the PAT/PMT pointer. It is also possible to read a predetermined amount of data at and after the start of the SOBU, perform a search in the data to extract a PAT_TSP closest to the start of the SOBU, a PMT_TSP closest to the start of the SOBU, and a transport packet including a PCR closest to the start of the SOBU, and output such transport packets before the SOBU is output, with the data therein being changed. Especially in the case of a transport stream conformed to the digital broadcast standards, the frequency of insertion of the PAT_TSP and the PMT_TSP may be defined. In that case, it is sufficient to read a predetermined amount of data corresponding to the frequency of insertion is read. Such a predetermined amount of data necessarily includes the PAT_TSP and the PMT_TSP. For example, when a PAT_TSP and a PMT_TSP exist at an interval equal to or less than 100 msec. within a 15 Mbps stream, the predetermined amount of data is 187.5 kilobytes. In this case, needless to say, the time for searching for the packets is additionally required.

In this case also, it is necessary to output transport packets of the number obtained by subtracting "1" from a continuity counter of the PAT_TSP, the PMT_TSP and the transport packet including the PCR before the SOBU is output. In the case where a program clock reference (PCR) field is included in the transport packet including the PAT or the PMT, it is also necessary to correct the PCR value such that the PCR value is reduced by the time period by which the above-identified transport packets are output before the SOBU is output. The transport packet including a PCR needs to be updated by enlarging the adaptation field so as to eliminate the payload portion.

A management file which is substantially the same as the management file in this embodiment may be recorded by the method described in Embodiment 1. In this embodiment, the management file is separately recorded. Alternatively, the management file may be stored in a transport packet; for example, may be recorded at the end of the recording file as a private PES stream divided to be included in the transport packet.

In this embodiment, the PAT/PMT pointer indicates the data size between (i) the PAT_TSP which was input most recently before the PMT_TSP, which was in turn input most recently before the SOBU, and (ii) the start of the SOBU. It is more preferable that the PAT/PMT pointer indicates the data size between (i) the PAT_TSP which was input most recently before the PMT_TSP, which was in turn input most recently before the transport packet including the PCR, which was in turn input most recently before the SOBU, and (ii) the start of the SOBU.

In this case, at the time of reproduction, only the PAT_TSP, the PMT_TSP and the transport packet including the PCR which are interposed between the start of the SOBU and the PAT/PMT pointer are output before the SOBU is output. As a result, the MPEG decoder on the side receiving the transport stream obtains the PCR value before referring to the PTS and the DTS described in the PES header of the first V_TSP of the SOBU. Therefore, the MPEG decoder can perform operations in consideration of the PTS and the DTS.

By contrast, according to this embodiment, the MPEG decoder cannot perform operations in consideration of the PTS and the DTS. It is necessary to perform timing control such as, for example, referring to a vbv_delay field in the video data and starting the decoding of the video when the time period from the time of input of the first V_TSP of the SOBU matches the value in the vbv_delay field.

In this embodiment, the PAT/PMT pointer indicates the data size between (i) the PAT_TSP which was input most recently before the PMT_TSP, which was in turn input most recently before the SOBU, and (ii) the start of the SOBU. Alternatively, the PAT/PMT pointer may indicate the position which is away from the start of the SOBU by a predetermined number (for example, before the start of the SOBU by 100 transport packets). In this case, it is preferred to set the predetermined number based on the frequency of insertion of the PAT, the PMT and the PCR, such that PAT, PMT and the PCR are necessarily included.

In this embodiment, the PAT/PMT pointer indicates the data size between (i) the PAT_TSP which was input most recently before the PMT_TSP, which was in turn input most recently before the SOBU, and (ii) the start of the SOBU. Alternatively, the PAT/PMT pointer may indicate the position of the transport packet which was input before the start of the SOBU by a predetermined time period (for example, before the start of the SOBU by 300 msec.).

When, for example, the PAT/PMT pointer may indicate the position of the transport packet which was input before the start of the SOBU by 300 msec., it is highly possible that the PAT_TSP, the subsequent PMT_TSP, and the subsequent PCR are included in this order between the above-identified position and the start of SOBU according to the standards of the Japanese digital broadcast and European digital broadcast (DVB). The reason is that the output frequency of the PAT_TSP and the PMT_TSP is regulated by the standards to be equal to or greater than once every 100 msec.

It is not absolutely necessary that the PAT/PMT pointer should indicate the position of the transport packet which was input before the start of the SOBU by a predetermined time period. The position may be searched for at the time of reproduction. This is only possible when the arrival time of each transport packet is separately recorded.

It should be noted that the time length validity flag may be set to "0" whenever the SOBU has a trick mode flag used for the special reproduction in the PES header.

In this embodiment, the PAT/PMT pointer indicates recorded as the management information. Alternatively, an actual transport packet including a PAT and an actual transport packet including a PMT may be recorded for each SOBU group which has the continuity of the MPEG standard, separately from the management information of each SOBU group. Such transport packets may be recorded for each recording file. In this case, when a transport packet including a DIT is detected, the recording file needs to be divided into a pre-detection portion and a post-detection portion. Alternatively, the recording file may include only a PAT and a PMT without including the transport packet headers.

When a transport packet including a PAT and a transport packet including a PMT are recorded for each recording file, the correspondence between the type of each elementary stream included in each transport packet and the PID, the PID of the PMT, the PID of the packet storing the PCR, and the like may be recorded in a summarized state as shown in FIG. 10, instead of recording the transports as they are.

Figure 11:
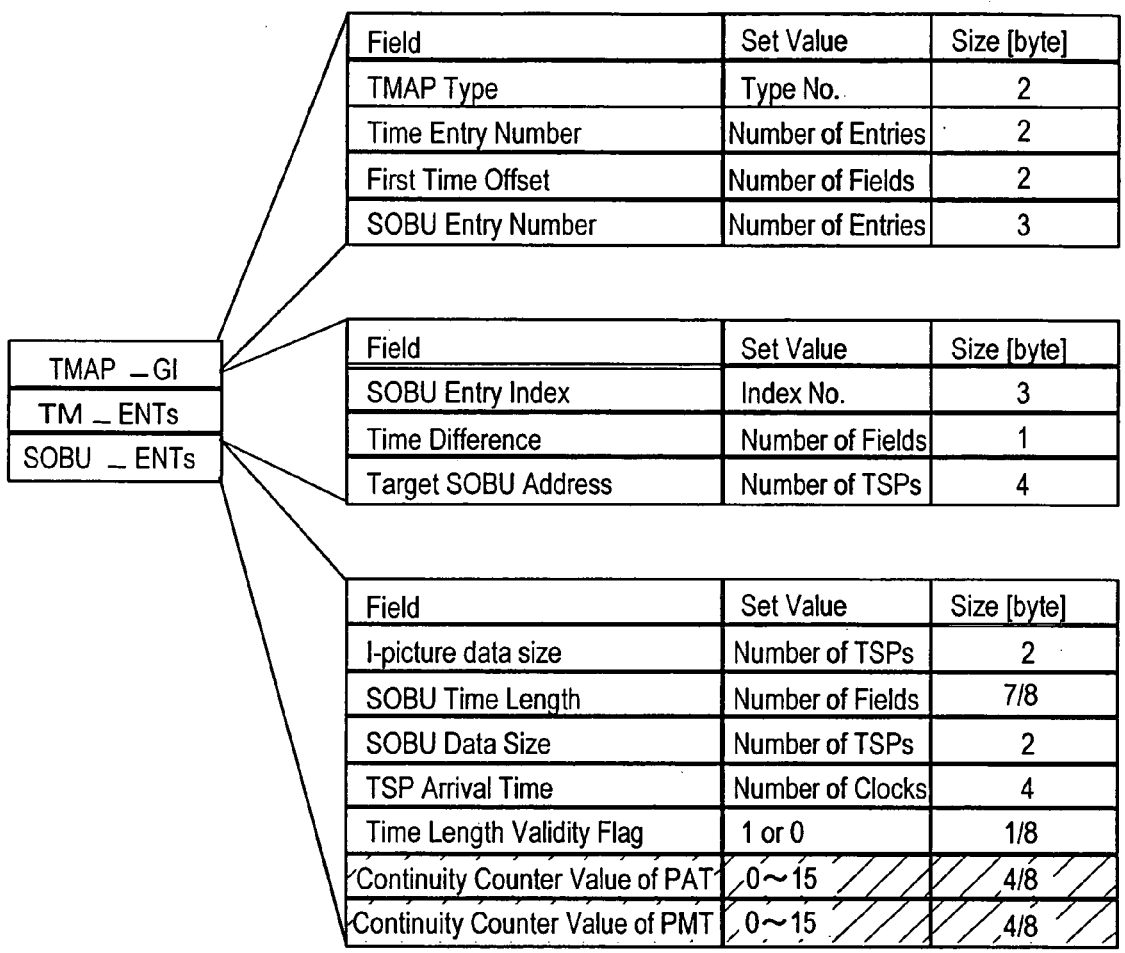
FIG. 11 shows a data structure of a different management file.

A value of a continuity counter of a first transport packet including a PAT in the SOBU and a first transport packet including a PMT of the SOBU may be detected and included in the management information. FIG. 11 shows an example of such management information of each SOBU.

Usually, the PAT and the PMT remain the same over a plurality of SOBUs. Therefore, an identifier for identifying the PAT_TSP and the PMT_TSP separately recorded as the management information of each SOBU group may be recorded for each SOBU group.

When a specific SOBU designated by the user is set as the reproduction start point, it is necessary to include each of a PAT and a PMT separately recorded in a transport packet and output the transport packets before the SOBU is output. It is also necessary to output a transport packet including a PCR between the time when the PMT is output and the time when the SOBU is output.

At this point, as the value of the continuity counter of each of the transport packet including the PAT and the transport packet including the PMT, a value obtained by subtracting "1" from the value of the continuity counter of each of the first PAT and the first PMT of the SOBU recorded as the management information may be used. By maintaining the value of the continuity counter of each of the first PAT and the first PMT of the SOBU recorded as the management information, a transport packet including a PAT and a transport packet including a PMT can be easily created.

In this embodiment, the V_TSP including the first byte of the sequence start code is located at the start of the second and subsequent SOBUS. Alternatively, another transport packet may be recorded at the start of the SOBUs. The reason is that it is sufficient that the first V_TSP of the SOBU includes the first byte of the sequence start code. For recording another transport packet, for example, a predetermined number of pieces of arrival time information provided for each transport packet may be stored collectively.

In this embodiment, the recorder 300 does not include an MPEG decoder. Alternatively, the recorder may include an MPEG decoder. Such a structure allows the data to be reproduced and displayed by processing performed inside the recorder.

In this embodiment, the V_TSP including a sequence header includes a PES header. It is not absolutely necessary that such a V_TSP should include a PES header. The reason is that the MPEG standard permits the PES header of the video to be located once, i.e., only at the start of the stream.

This embodiment does not describe the time to output the PAT_TSP, the PMT_TSP and the transport packet including the PCR, which are output before the first V_TSP of the SOBU. Such transport packets may be output with some time intervals, in consideration of the processing rate on the receiving side.

In this embodiment, the first SOBU is recorded from the PAT_TSP. Alternatively, the first SOBU may be recorded from another type of transport packet. For example, all the transport packets until the arrival of the first PAT_TSP may be recorded.

In this embodiment, the SOBU time length and the TSP arrival time of each SOBU are recorded. Alternatively, only the TSP arrival time of each SOBU may be recorded. In this case, it is not necessary to detect the sequence header or to count the number of fields, and the management information generating section can be simplified.

Embodiment 3

Hereinafter, an apparatus according to Embodiment 3 of the present invention will be described with reference to FIG. 12. Embodiments 1 and 2 concern recording and reproduction of a video file. Embodiment 3 concerns recording and reproduction of an audio file.

A recorder for recording and reproducing an audio file according to this embodiment has substantially the same structure as that of the recorder 200 shown in FIG. 5, and will not be described in detail in this embodiment.

Figure 12:
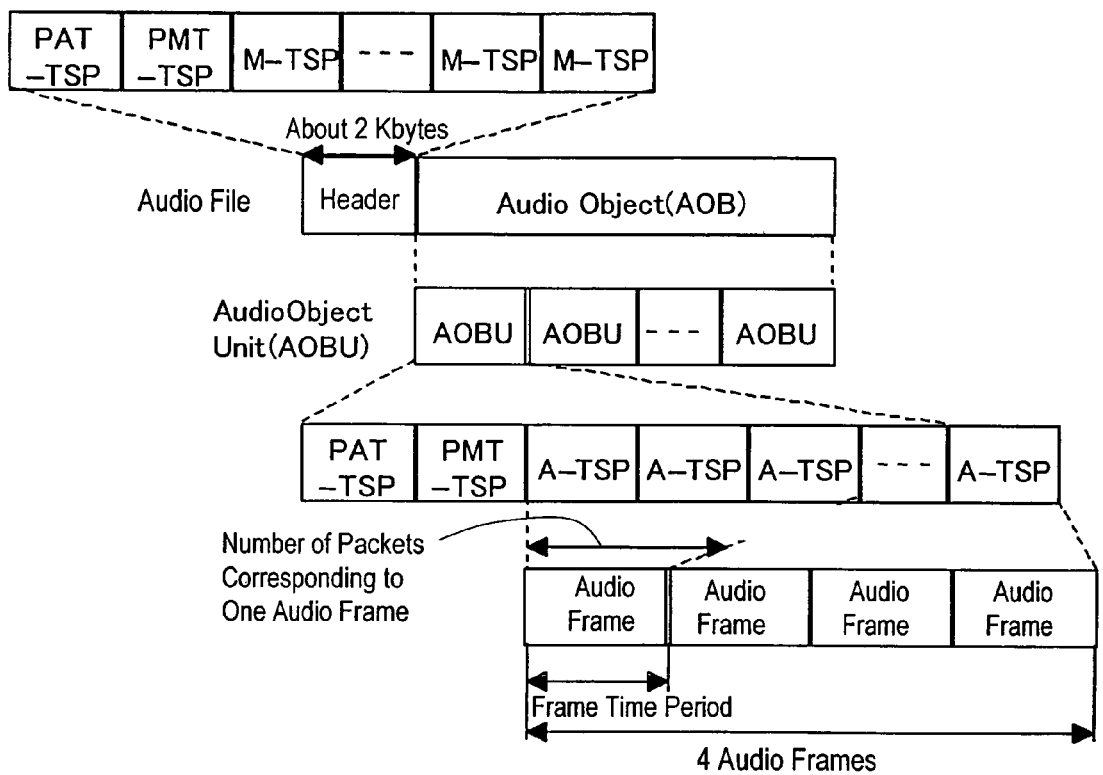
FIG. 12 shows a data structure of an audio file according to Embodiment 3 of the present invention.

FIG. 12 shows a data structure of an audio file. As shown in FIG. 12, the audio file includes a header having a fixed length of data size (for example, 2 kilobytes) and an audio object (hereinafter, referred to as an "AOB"). An AOB includes a plurality of audio object units (hereinafter, an audio object unit will be referred to as an "AOBU").

The header stores management information on the audio file. Each AOBU includes a predetermined number of (for example, four) audio frames. At the start of each AOBU, a PAT_TSP and a PMT_TSP are included. One audio frame includes a predetermined number of (for example, three) transport packets A_TSPs. In the example shown in FIG. 12, the bit rate of the audio frame is fixed.

By adopting the data structure of the audio file shown in FIG. 12, the PAT_TSP and the PMT_TSP are included with certainty even when the reproduction starts with an AOBU in the middle of the audio file. Accordingly, regardless of with which AOBU the reproduction of the audio file starts, the reproduction can start with the first audio frame with certainty.

In the case where one AOBU includes four audio frames as in this embodiment, the PAT and the PMT can be inserted at an interval equal to or less than 10 msec., which is conformed to the 1394 transfer standards used by the Japanese BS digital broadcast. This specifically applies to the case where the ISO/IEC 13818-7 Advanced Audio Coding compression is used with 48 kHz sampling and 1024 samples.

In FIG. 12, the timing of insertion of the PAT_TSP and the PMT_TSP, the number of audio frames included in each AOBU, and the number of transport packets included in one audio frame are fixed. In this case, the position of the AOBU corresponding to the time can be found by a simple calculation when the reproduction is to start with an AOBU designated in the middle of the audio file due to the time designation. Therefore, it is not necessary to record tables corresponding to the TM_ENTs or the SOBU_ENTs described in Embodiment 2. All information that is necessary is the time period of one audio frame, the number of transport packets included in one audio frame, and the number of audio frames included in one AOBU. Only such information needs to be recorded in, for example, the header of the audio file.

In this embodiment, the timing of insertion of the PAT_TSP and the PMT_TSP, the number of audio frames included in one AOBU, and the number of transport packets included in one audio frame are fixed. Alternatively, the number of audio frame included in one AOBU, and the number of transport packets included in one audio frame may be equal to or less than a predetermined number. In this case, however, it is preferable to record tables corresponding to the TM_ENTs or the SOBU_ENTs described in Embodiment 2 as separate management files.

In Embodiments 1 and 3, the PAT_TSP and the PMT_TSP are located at the start of a VOBU or an AOBU. Alternatively, the PAT_TSP and the PMT_TSP may be recorded immediately after another transport packet, which is recorded at the start of the VOBU or the AOBU. The reason is that the PAT_TSP and the PMT_TSP only need to be recorded before the first V_TSP or the first A_TSP of the VOBU or the AOBU. For recording another transport packet, for example, a predetermined number of pieces of arrival time information provided for each transport packet may be stored collectively.

It is preferable that a PCR is included in the transport packer header of the first A_TSP of the AOBU. The reason is that such a structure allows the PAT_TSP, the PMT_TSP and the PCR to be output before the audio data in the A_TSP.

Embodiment 4

Figure 13:
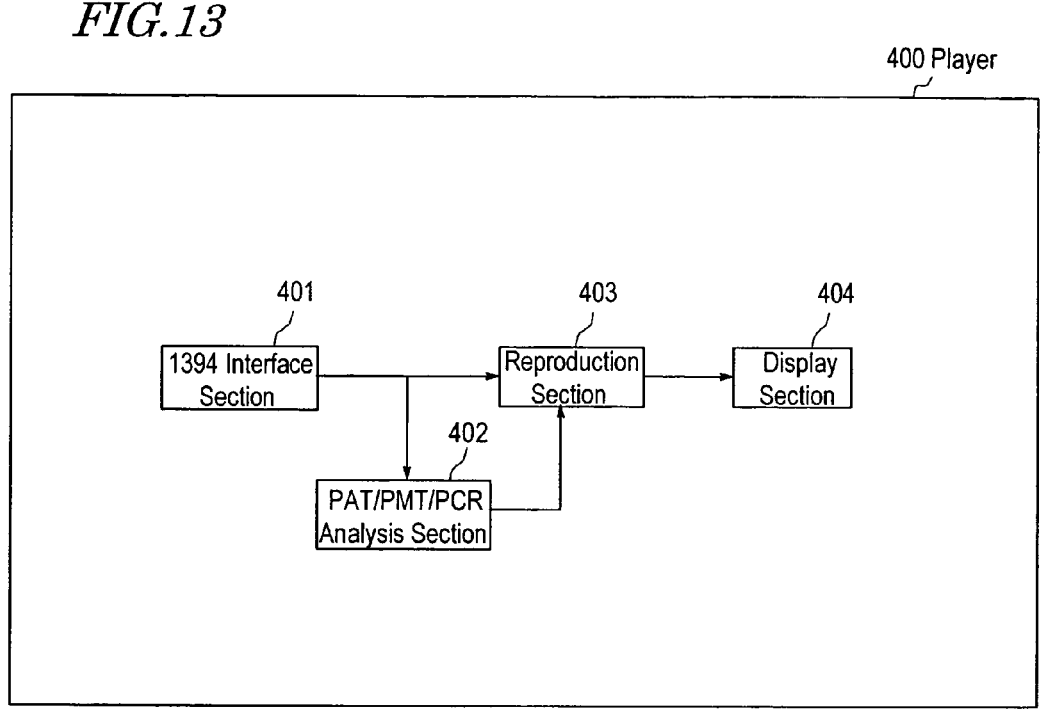
FIG. 13 is a block diagram showing a structure of a player 400 according to Embodiment 4 of the present invention.

FIG. 13 shows a structure of a player 400 according to Embodiment 4 of the present invention. The player 400 is connected to, for example, the 1394 interface section of the recorder 200 (FIG. 5) via a 1394 cable.

When a transport stream which is input from a 1394 interface section 401, a PAT, a PMT and a PCR are extracted from the transport stream by a PAT/PMT/PCR analysis section 402. After the analysis, the PAT/PMT/PCR analysis section 402 sends the PIDs of the video data and the audio data and the PCR which are necessary for decoding to a reproduction section 403. Upon receipt of the PID of the video data, the PID of the audio data, and the PCR, the reproduction section 403 starts accumulating the input transport stream. Using the information received, the reproduction section 403 starts decoding the transport stream. The reproduction section 403 transfers the decoded video and audio signals to a display section 404.

When a transport packet including a PCR is a trigger of accumulation and decoding at the start of decoding, such a transport packet and the subsequent transport packets are accumulated and decoded. After this, the PAT/PMT/PCR analysis section 402 transfers the PIDs or the PCR to the reproduction section 403 each time a PAT, a PMT or a PCR is detected.

With the above-described structure, a transport stream which is output from the 1394 interface section of the recorder according to any one of Embodiments 1 through 3 is received by the 1394 interface section 401 of the player 400 shown in FIG. 13. Thus, the transport stream can be reproduced from the start thereof with certainty.

The time period required for analysis performed by the PAT/PMT/PCR analysis section 402 is different depending on the apparatus. In one type of apparatus, the processing time is 0.5 second, whereas in another type of apparatus, the processing time is 1.0 second. However, as long as the transmission side apparatus according to any one of Embodiments 1, 2 and 3 of the present invention outputs a uniform type of transport stream, the player according to Embodiment 4 on the receiving side can start reproducing the video or the like as soon as the PAT/PMT/PCR analysis section 402 finishes the analysis, regardless of the processing time.

This method can shorten the delay time until the video and audio outputs as compared to the method by which the transmission side apparatus estimates the maximum value of the analysis processing time, outputs only transport packets including a PAT, a PMT and a PCR, and stops the output of the transport packets only while the analysis processing time is at the maximum value. The method according to this embodiment can also shorten the time required for switching scenes even in the case where a plurality of specific scenes are selected and continuously reproduced.

When scenes are switched as described above, the time to switch the scenes may be notified in advance to the apparatus. What is notified may be, for example, the time to reproduce the first frame of the next scene which is represented as a value of an STC (system time clock) used for the immediately previous scene. The notification may be performed, for example, by using an AVC command of the 1394 standard, or by using a special transport packet.

Information on the PAT and the PMT of the next scene may be notified to the apparatus slightly before the switching point of the transport stream. For the notification, the version_number fields and the current_next_indicator field of the PAT and the PMT may be used.

At the switching point of scenes, the transmission side apparatus may insert a transport packet including a DIT (Discontinuity Information Table), so that the switching timing in the transport stream can be confirmed by monitoring the input transport stream.

In this embodiment, the PAT/PMT/PCR analysis section 402 receives the PAT, the PMT and the PCR in this order. Even when receiving the PAT, the PMT and the PCR in a different order, the PAT/PMT/PCR analysis section 402 may transfer the PIDs of the video and audio data included in the PAT and the PMT, the PCR information, and other information to the reproduction section 403.

On the condition that such processing is performed, it is possible to extract a PAT_TSP, a PMT_TSP and a transport packet including a PCR from the transport packets which were input before, by equal to or less than 100 msec., the transport packet including the sequence header in Embodiment 3 and to output the transport packets in that order. In whichever order the PAT_TSP, the PMT_TSP and the transport packet including the PCR may be output, the apparatus on the receiving side rearranges these transport packets into the order of the PAT_TSP, the PMT_TSP and the transport packet including the PCR before performing the analysis. Therefore, it is not necessary to extract these transport packets from the transport stream which was input 300 msec. before.

On the condition of such processing, it is not necessary to maintain the order of outputting or recording the transport packets to the order of the PAT_TSP, the PMT_TSP and the transport packet including the PCR in Embodiments 1 and 2. The PAT/PMT pointer in Embodiment 3 can refer to the position information of the transport packet which was input at the oldest time among the PAT_TSP, the PMT_TSP and the transport packet including the PCR. The reason is that these three types of transport packets exist between the referred position and the start of the SOBU.

Embodiment 5

Figure 14:
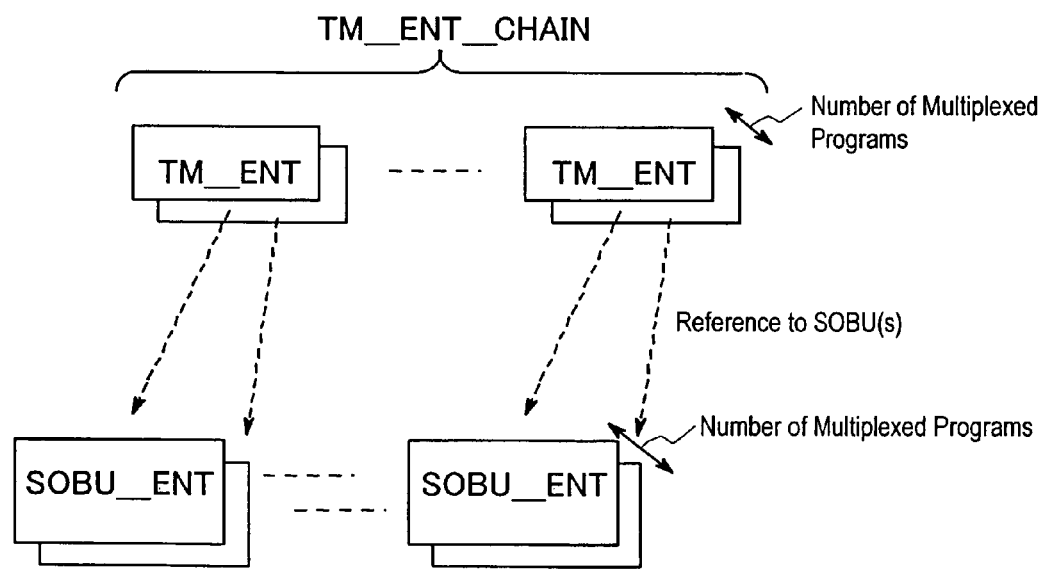
FIG. 14 shows a data structure of a management file according to Embodiment 5 of the present invention.

FIG. 14 shows a data structure of management information of a transport stream used for multi-view broadcast of the Association of Radio Industries Businesses (ARIB) standard. With multi-view broadcast, a maximum of three programs are multiplexed in one transport stream. In the case of such a transport stream, an SOBU_ENT table and a TM_ENT table are created for each program.

Then, the SOBU table of each of programs 1, 2 and 3, the display time of which are close to each other, are repeatedly recorded in the manner of programs 1, 2, 3, 1, 2, 3, . . . . The TM_ENT tables are recorded in a similar manner. The SOBU_ENT table and the TM_ENT table have the same data structure as that of Embodiment 2. The number of multiplexed programs is recorded in the TMAP_GI. Except for the above, the data structure of the transport stream is the same as that of Embodiment 2.

With the above-described structure, a transport stream including a PAT, a PMT and a PCR can be output from any sequence header of any program even in the case of multi-view broadcast.

The SOBU_ENT tables of programs 2 and 3 may be recorded in series after the SOBU_ENT table of program 1. Likewise, the TM_ENT tables of programs 2 and 3 may be recorded in series after the TM_ENT table of program 1.

Embodiment 6

Hereinafter, two types of management files of a data stream will be described. Then, a management file according to this embodiment of the present invention, which can be easily converted into either type of management file will be described. An apparatus according to this embodiment for generating such a management file will also be described.

It should be noted that, in the following description, reproduction units of a moving picture stream which has been self-encoded by the recorder are referred to as "SOBU". The SOBU and VOBU are not distinguished for convenience.

Figure 15:
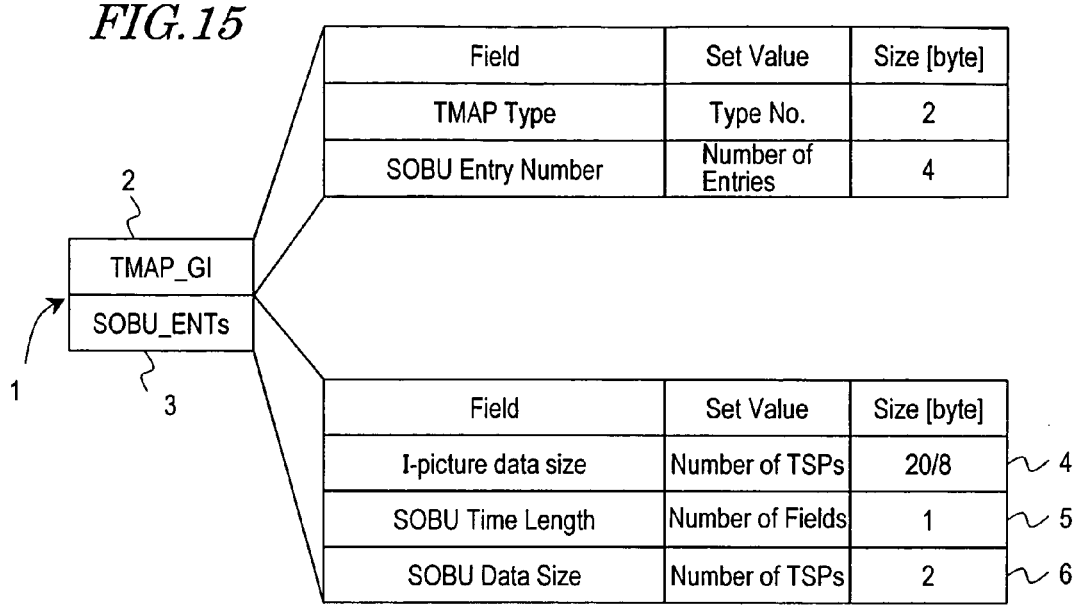
FIG. 15 shows a data structure of a first exemplary management file.

FIG. 15 shows a data structure of a first management file 1.

A recording apparatus such as an optical disc recorder or the like generates at least one SOBU and records the at least one SOBU as a stream file. Then, the recording apparatus records a management file storing management information regarding the stream file. The stream file and the management file are located in the same directory on the phase change optical disc 131. The stream file and the management file are assigned the same file name with different extensions. For example, the stream file and the management file are recorded as MOVIE001.MPG (stream file) and MOVIE001.CTL (management file) while the 1:1 correspondence is maintained. The management information in the management file is used, for example, to reproduce video and audio from arbitrary point within the stream file. At the time of reproduction, the apparatus derives from the management file an address where the SOBU to be reproduced is located, based on an elapsed time from the beginning to the start time of reproduction designated by the user. The apparatus begins the reproduction of video and so on using data stored in the address of the stream file.

The management file 1 shown in FIG. 15 includes a TMAP_GI table 2 and a plurality of SOBU_ENT tables (SO-BU_ENTS) 3.

In the TMAP_GI table 2, a type No. is stored in a TMAP type field as an identifier of a data structure of the management file 1. In an SOBU entry number field, the number of SOBU_ENT tables 3 is stored.

Next, the SOBU_ENT table 3 will be described. First, the data size of the I picture recorded at the start of an SOBU is set in an "I-picture data size" field 4. The value to be set is the number of transport packets from the transport packet storing the start of the data of the I picture to the transport packet storing the end of the data. Between two adjacent transport packets, another transport packet storing audio data, for example, may be interleaved. In this case, the value which is set as the number of transport packets includes the number of any transport packet(s) not storing the data of the I picture.

A total reproduction time period of the pictures included in each SOBU is set in an SOBU time length field 5. The value to be set is the number of video fields when the respective SOBU is reproduced. The data size of each SOBU is set in an SOBU data size field 6. The value to be set is the number of transport packets included in the respective SOBU. Since the data length of a transport packet is fixed to 188 bytes, the data length of the SOBU can be easily specified by describing the number of transport packets included in the SOBU.

For recording a transport stream which is input via a 1394 interface section 604 also, a stream file and a management file may be created at the same file.

Figure 16:
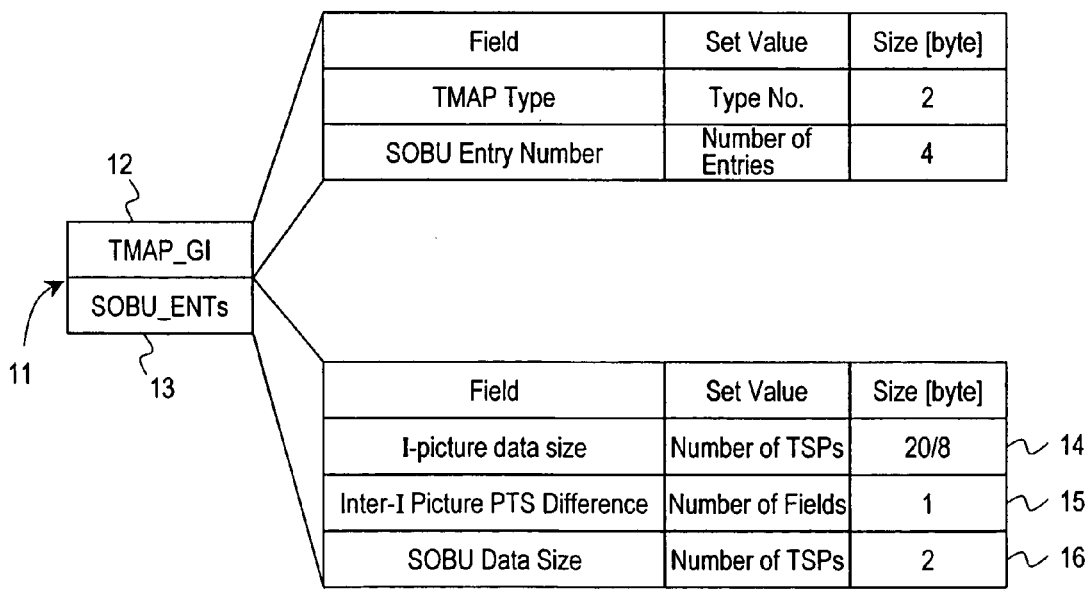
FIG. 16 shows a data structure of a second exemplary management file.

FIG. 16 shows a data structure of a second management file 11. The management file 11 is adopted in, for example, Blu-ray discs.

The management file 11 includes a TMAP_GI table 12 and a plurality of SOBU_ENT tables (SOBU_ENTs) 13.

In the TMAP_GI table 12, a type No. is stored in a TMAP type field as an identifier of a data structure of the management file 11. In an SOBU entry number field, the number of SOBU_ENT tables 13 is stored.

The SOBU_ENT table 13 includes an "I-picture data size" field 14, an inter-I picture PTS difference field 15, and an SOBU data size field 16. In the fields 14 and 16, information which is equivalent to the information described in the "I-picture data size" field 4 and the SOBU data size field 6 of the management file 1 is described.

In the PTS difference field 15, a PTS difference between the I pictures recorded at the start of two adjacent SOBUs in the transport data stream is set.

Figure 17:
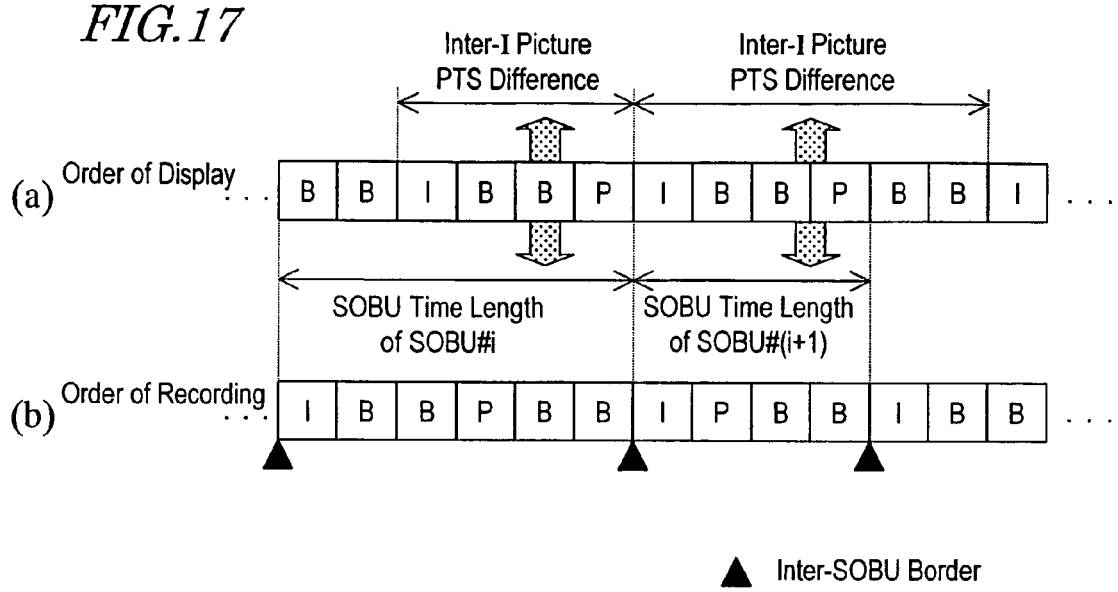
FIG. 17 shows the relationship among SOBUs, the definition of the PTS difference between the I pictures at the start of the SOBUs, and the SOBU time length.

Hereinafter, with reference to FIG. 17, the PTS difference will be described in more detail. FIG. 17, part (a), shows the relationship among the SOBUs, the definition of the PTS difference between the I pictures at the start of the SOBUs, and the SOBU time length. Letters "B", "I" and "P" respectively represent the B picture, the I picture and the P picture of the MPEG standard. The pictures are shown in the order of being reproduced.

As shown in FIG. 17, part (a), the pictures in SOBU #i, SOBU #(i+1) and SOBU #(i+2) are displayed in the order of BBIBBP, IBBP, BBI, respectively. Each SOBU time length in FIG. 17, part (a), indicates the reproduction time length of the video frames included in the respective SOBU, and is defined by the unit of the number of video fields. The inter-I picture PTS difference is defined as the time difference between the display timing (PTS) of the I frame at the start of one SOBU and the display timing (PTS) of the I frame at the start of the immediately subsequent SOBU. It should be noted that in this embodiment, the time difference is set as the number of video fields, instead of the PTS value which is actually provided.

FIG. 17, part (b), shows the order in which the data of the pictures is located in a transport stream. The data of the pictures is recorded on a storage medium in this order. FIG. 17, part (b), shows that SOBU #i, SOBU #(i+1) and SOBU #(i+2) respectively include the pictures of IBBPBB, IPBB, and IBB obtained by compressing video frames. In FIG. 17, the number of video frames included in one SOBU is exemplary. A larger number of pictures may be included in one SOBU.

In this specification, it is assumed that a management file having the data structure shown in FIG. 15 is recorded on an HDD or a phase change optical disc, and a management file having the data structure shown in FIG. 16 is recorded on a memory card. It is also assumed that the data structure of stream file is the same regardless of the type of recording medium. Namely, a stream file includes a transport stream on both an HDD and a phase change optical disc. The data structure of the stream file and the management file may be provided by the standard of the storage medium or may be arbitrarily determined.

In this embodiment, a new management file which is easily convertible both to the management file 1 shown in FIG. 15 and the management file 11 shown in FIG. 16 is provided. Such a management file is created together with a stream file. When transferring a data stream from a recorder to another apparatus, the management file of the data stream according to this embodiment can be converted to the type of management file adapted to the apparatus, to which the data stream is to be transferred. Since it is not necessary to analyze the entire data stream to newly create a management file, the data stream and the management file can be transferred in a short time.

Hereinafter, a structure and operation of a recorder for generating a management file according to this embodiment, and a data structure of the management file will be described.

Figure 18:
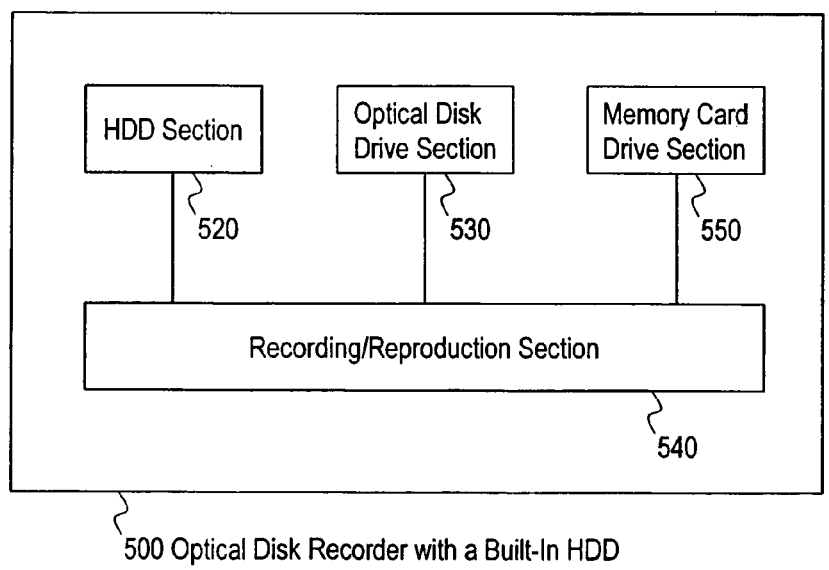
FIG. 18 is a block diagram showing a structure of main function blocks of an optical disc recorder 500 with a built-in HDD according to Embodiment 6 of the present invention.

FIG. 18 shows a structure of main functional blocks of an optical disc recorder 500 with a built-in HDD according to this embodiment. The optical disc recorder 500 with a built-in HDD (hereinafter, referred to as the "recorder 500") encodes a video signal and an audio signal in a recording/reproduction section 540 to generate a transport stream and management information thereof. The recorder 500 then records the transport stream and the management information on a storage medium as a stream file and a management file via an HDD (HDD drive) section 520 and/or an optical disc drive section 530. The management file includes an SOBU time length field as shown in FIG. 15, but has a different data structure from that shown in FIG. 15. The data structure of the management file will be described later in more detail with reference to FIG. 20.

Figure 19:
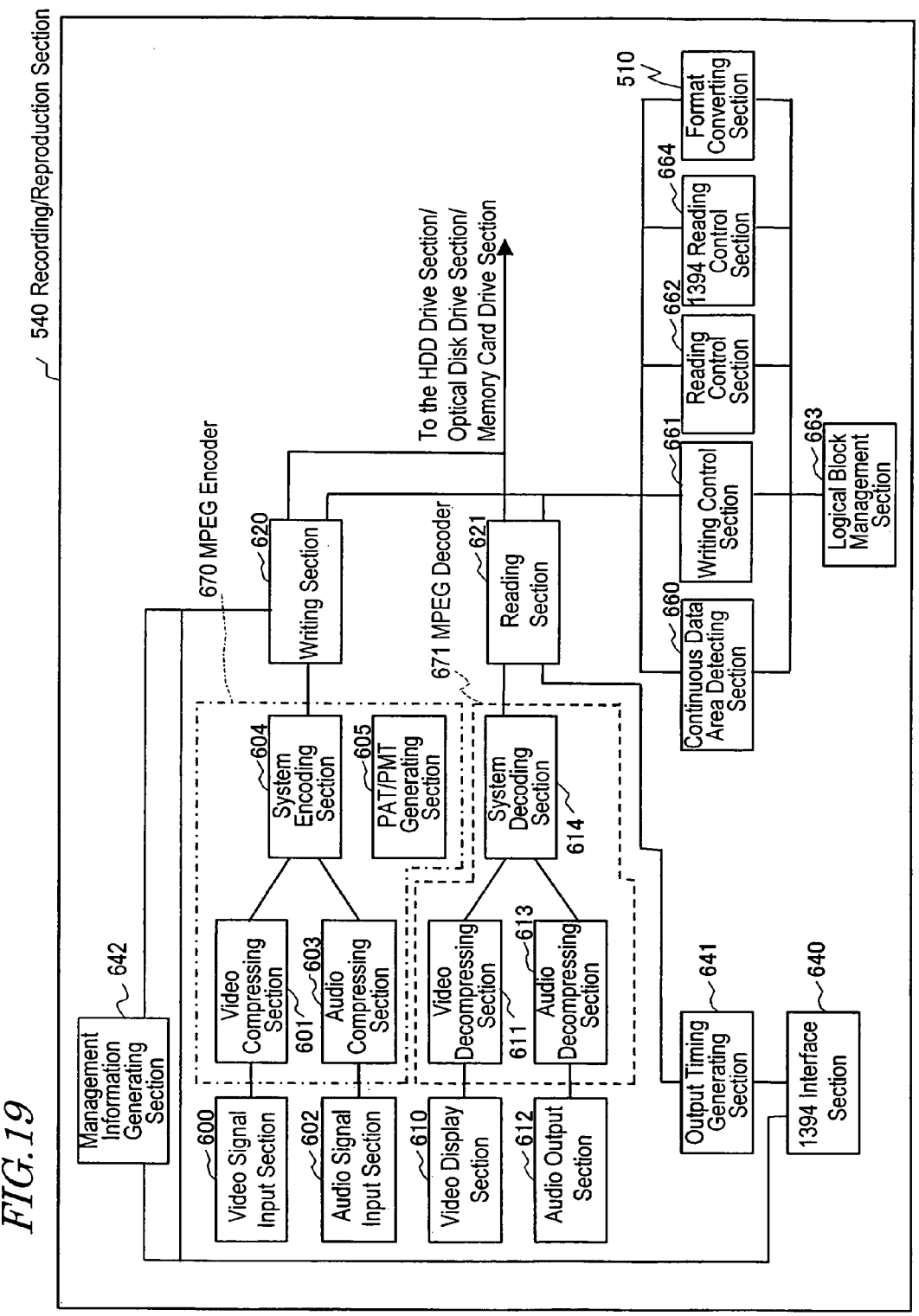
FIG. 19 shows a structure of a recording/reproduction section 540 of the optical disc recorder 500 according to Embodiment 6.

FIG. 19 shows a detailed structure of the recording/reproduction section 540 of the recorder 500. For receiving a video signal and an audio signal and self-encoding the signals, the recorder 500 performs processing which is basically the same as the recording processing performed on a stream by the recorder 200 and the recording processing performed on management information including the SOBU time length shown in FIG. 15

A format converting section 510 of the recording/reproduction section 540 can read a stream file recorded on an HDD or a phase change optical disc and write the stream file on a memory card via a memory card drive section 550. The format converting section 510 can also read a management file recorded on an HDD or a phase change optical disc and write the management file on a memory card via the memory card drive section 550 after format conversion of the management file.

The recording/reproduction section 540 can receive a transport stream from another apparatus via a 1394 interface section 640 and record the transport stream (i.e., import the transport stream). The recording/reproduction section 540 can also transmit a transport stream to another apparatus via the 1394 interface section 640 and cause the apparatus to record the transport stream (i.e., export the transport stream). The import/export processing is the same as the import/export processing performed on a stream in Embodiment 2. The processing of recording the management information as a management file is performed in substantially the same manner as performed on the management information shown in FIG. 16.

Figure 20:
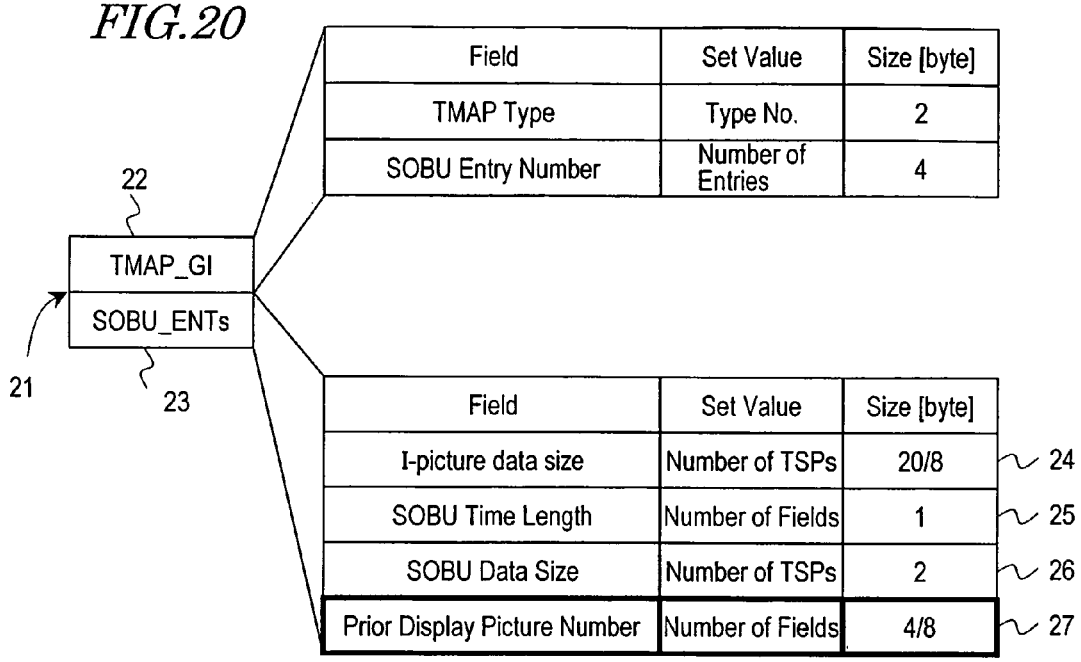
FIG. 20 shows a data structure of a management file according to Embodiment 6.

FIG. 20 shows a data structure of a management file 21 according to this embodiment. The management file 21 includes a TMAP_GI table 22 and a plurality of SOBU_ENT tables (SOBU_ENTs) 23.

Unlike the management file 1 shown in FIG. 15, the management file 21 includes a prior display picture number field 27 in each SOBU_ENT table 23 in addition to the fields included in the management file 1. In the prior display picture number field 27, information on the video frame(s) displayed before the I frame at the start of each SOBU is described. In the other fields, information equivalent to the information in the corresponding fields of the management file 1 shown in FIG. 15 is described.

An SOBU time length field 25 and an SOBU data size (or an SOBU recording position) field 26 are included in each SOBU_ENT table 23. The information in these fields 25 and 26 is treated as information inherent to the respective SOBU.

Hereinafter, with reference to FIG. 21, what is meant by the information described in the prior display picture number field 27 will be described.

Figure 21:
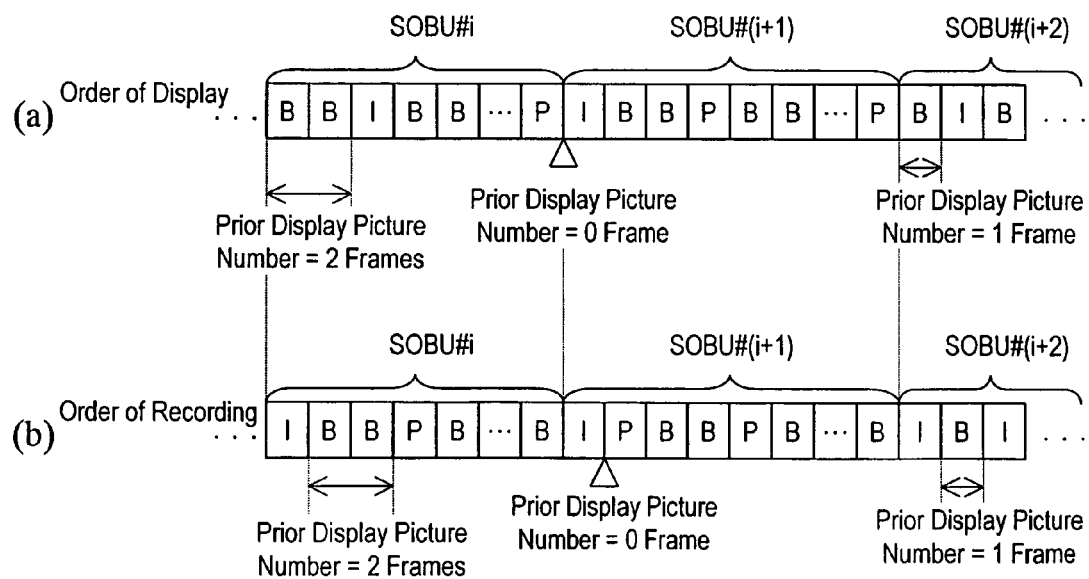
FIG. 21 shows the definition of a prior display picture number which is recorded in the management file according to Embodiment 6.

FIG. 21 schematically shows the definition of a prior display picture number of the management file.

FIG. 21, part (b), shows the order in which data of the frames is recorded. In SOBU #i, SOBU #(i+1) and SOBU #(i+2) in a transport stream, data of the pictures is recorded in the order of IBBPB . . . B, IPBBPB . . . B, IBI . . . , respectively.

FIG. 21, part (a), shows the order in which the frames are displayed. In this example, the order of display is BBIBB . . . P, IBBPBB . . . P, and BIB . . . in SOBU #i, SOBU #(i+1) and SOBU #(i+2), respectively. According to FIG. 21, part (a), in SOBU #i, two B frames are displayed before the I frame recorded at the start thereof. Therefore, the prior display picture number is 2 frames (4 fields).

In SOBU #(i+1) subsequent to SOBU #1, no frame is displayed before the I frame recorded at the start thereof. Therefore, the prior display picture number is 0 frame (0 field).

In SOBU #(i+2), one B frame is displayed before the I frame recorded at the start thereof. Therefore, the prior display picture number is 1 frame (2 fields).

The recorder 500 receives a video signal and then self-encodes the video signal to generate a transport stream. Therefore, each time an SOBU is generated, the time length of the frame(s) displayed before the I frame recorded at the start of the respective SOBU can be specified.

The time length of the frame(s) displayed before the I frame recorded at the start of each SOBU, which is specified as described above, is described in the prior display picture number field 27 of the SOBU_ENT table 23 by the unit of the number of video fields. In a video system for displaying 30 frame images per second, 1 field image corresponds to the time length of 1/60 second. Therefore, when two frame images are displayed before the I frame, "4" is described in the prior display picture number field 27.

The reason why the prior display picture number is described using the number of video fields is as follows. In the case where, for example, a film material of substantially 24 frames is recorded after being subjected to 3:2 pull-down conversion to have 60 fields per second, one video frame recorded may have a reproduction time length corresponding to 2 fields or 3 fields. Accordingly, it is preferable to use the number of fields as the unit. If such a case is not assumed, the prior display picture number may be described by the unit of the number of video frames, needless to say.

Figure 22:
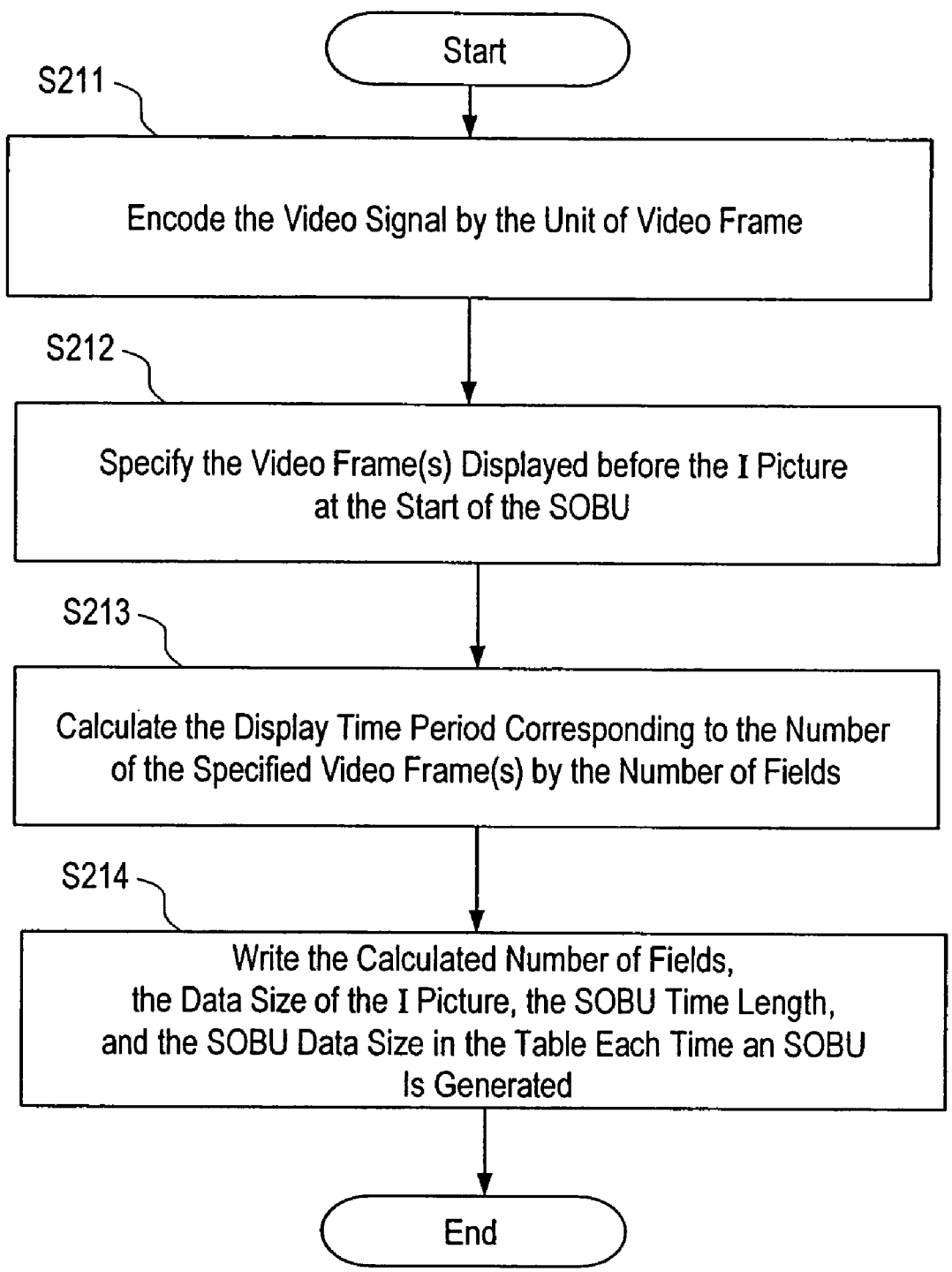
FIG. 22 is a flowchart showing a procedure of generating a management file 21 by the recorder 500.

FIG. 22 shows a procedure of generating the management file 21 by the recorder 500. For the purpose of simplicity, the description is focused on a processing performed on a video signal, hereinafter.

In step S211, an MPEG encoder 670 encodes a video signal by the unit of video frame. In step S212, the MPEG encoder 670 specifies the video frame(s) displayed before the I picture (I frame) at the start of the SOBU. Specifically, the MPEG encoder 670 may specify which video frame has been encoded as the first I frame among the video frames which were input after the video frame at the end of the immediately previous SOBU. In this manner, the MPEG encoder 670 can specify the video frame(s) input before the video frame encoded as the first I frame (i.e., the MPEG encoder 670 can specify B frame(s) displayed before the first I frame). The MPEG encoder 670 then outputs information on the number of video frame(s) displayed before the first I frame. Instead of the information on the number of video frame(s), the MPEG encoder 670 may output notification every time a video frame displayed before the first I frame is generated.

At this point, the MPEG encoder 670 also outputs information on the I-picture data size, the SOBU time length, and the SOBU data size. The MPEG encoder 670 encodes a video signal and aligns the packets. Therefore, each time an SOBU is generated, all of such information on the SOBU is specified.

In step S213, a management information generating section 642 calculates a display time length corresponding to the specified video frame(s) by the number of fields. In step S214, the management information generating section 642 describes the calculated number of the fields in the prior display picture number field 27 in the SOBU_ENT table 23. The management information generating section 642 also describes the information on the I-picture data size, the SOBU time length, and the SOBU data size, each time an SOBU is generated.

As a result of the above-described processing, SOBU_ENT tables (SOBU_ENTs) 23 are generated. Once the all the SOBUs are generated, the contents of the TMAP_GI table 22 are determined.

After this, a writing control section 661 receives the management information and sends the management information to the HDD section 520 and/or the optical disc drive section 530 to be written on an HDD and/or a phase change optical disc. As a result, the management file 21 is obtained.

When the management file 21 is to be written on the HDD, it is not necessary to consider if the data to be written on the HDD is compatible with an external apparatus or not because the HDD is built in the recorder 500. Therefore, there occurs no problem if the management file 21 having the data structure according to this embodiment is written on the HDD. When the management file is output to an external apparatus which is not compatible with the data structure of the management file 21, the management file 21 can be converted into the management file 1 shown in FIG. 15 or the management file 11 shown in FIG. 16 by the conversion processing described later with reference to FIG. 23.

A phase change optical disc is removable and may possible be loaded into an apparatus which is not compatible with the management file 21. In such a case, the apparatus may not be able to process the management file 21 recorded on the phase change optical disc and may generate an error. However, there is no problem in recording the management file 21 on a phase change optical disc once in consideration of, for example, the possibility of the data structure of the management file 21 being standardized in the future.

The recorder 500 according to this embodiment can reproduce a video signal and an audio signal using the management file 21. For example, the recorder 500 can easily reproduce a portion of a designated stream from the 10th second counted from the start of the designated stream, by referring to management file 21.

Specifically, such processing is performed as follows. The management information generating section 642 adds the values of the SOBU time length fields 25 of the SOBUs until the count exceeds 10 seconds. When the count exceeds 10 seconds, the data of the video frame at the 10th second is stored in the SOBU which includes the SOBU time length field 25, the value of which was last added. When the management information generating section 642 specifies that SOBU, a reproduction section 621 reads the SOBU based on an instruction from a reading control section 662 and sends the SOBU to an MPEG decoder 671. The MPEG decoder 671 decodes the SOBU and outputs a portion of the stream from the 10th second counted from the start of the stream. As a result, the reproduction of the stream starts with the video data at the designated time. The above-described processing is performed for outputting the video via the 1394 interface section 640 as well as for reproducing the video data.

Next, processing performed by the recorder 500 for converting the management file 21 into the management file 1 shown in FIG. 15 or the management file 11 shown in FIG. 16 will be described. In this example, the conversion is performed for transferring a stream file and a management file recorded on an HDD of the recorder 500 to another recording medium.

Figure 23:
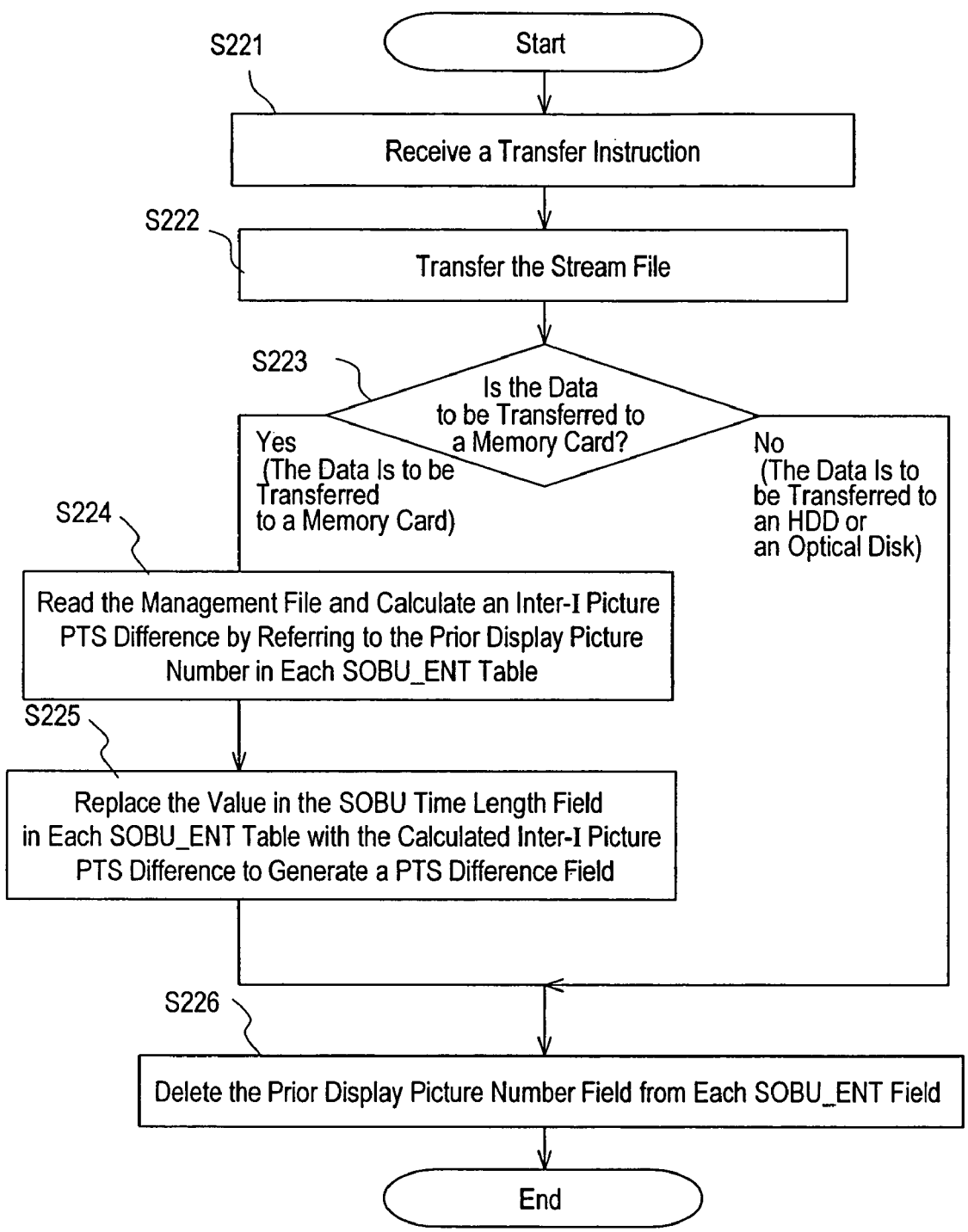
FIG. 23 is a flowchart showing a procedure of converting the management file.

FIG. 23 shows a procedure of converting the management file 21.

First in step S221, the recorder 500 receives a transfer instruction from the user via a remote controller or a button on the main body of the recorder 500 (neither is shown). At this point, the storage medium to which the data is to be transferred and the recording apparatus for reproducing the data are specified in addition to the transfer instruction. Then, in step S222, the reading control section 662 of the recorder 500 instructs the reading section 621 to read the stream file from the HDD. The stream file read by the reading section 621 is transferred to, for example, the optical disc drive section 530 or the memory card drive section 550 and written on the specified recording medium. As described above, the transport stream is transferred with no modification regardless of the type of recording medium.

In and after step S223, the management file 21 is converted. First in step S223, the format converting section 510 determines whether the storage medium to which the data is to be transferred is a memory card or not. The reason why such determination is needed is to change processings.

When such a medium is a memory card, the management file 21 needs to be converted into the management file 11 shown in FIG. 16. In this case, the processing advances to step S224.

Whereas when such a medium is a storage medium other than a memory card (for example, an optical disc), the management file 21 needs to be converted into the management file 1 shown in FIG. 15. The processing advances to step S226.

The term "memory card" encompasses a memory card mounted on the recorder 500 as well as a memory card mounted on an external apparatus connected to the recorder 500. The term "a storage medium other than a memory card" encompasses an optical disc loaded into the recorder 500 as well as an optical disc loaded into, and an HDD included in, an external apparatus connected to the recorder 500.

Next in step S224, the reading section 621 reads the management file 21 based on an instruction from the reading control section 662. The format converting section 510 receives the management file 21 and calculates the inter-I picture PTS difference by referring to the prior display picture number field 27 of each SOBU_ENT table 23.

The PTS difference can be calculated in accordance with the following equation 1 using the relationship shown in FIG. 17 between the SOBU time length and the prior display picture number in the SOBU_ENT table 23.

The inter-*I* picture PTS difference in SOBU_ENT table #*j* (FIG. 16)=the SOBU time length in the SOBU_ENT table #*j* (FIG. 20)−the prior display picture number in the SOBU_ENT table #*j* (FIG. 20)+the prior display picture number in the SOBU_ENT table #(*j*+1) (FIG. 20)   <Equation 1>

Next in step S225, the management information generating section 642 replaces the value in the SOBU time length field 25 in each SOBU_ENT table 23 with the calculated PTS difference. As a result, the PTS difference field 15 shown in FIG. 16 is generated.

In step S226, the format converting section 510 deletes the prior display picture number field 27 from each SOBU_ENT table 23. By the above-described processing, the management file 11 shown in FIG. 16 can be obtained from the management file 21 shown in FIG. 20.

When it is determined in step S223 that the data is to be transferred to a storage medium other than a memory card, the management file 1 is obtained merely by deleting the prior display picture number field 27 from each SOBU_ENT table of the management file 21. This is clear from the relationship between the management file 21 shown in FIG. 20 and the management file 1 shown in FIG. 15.

The fields other than the fields referred to in the above-described processing do not need to be converted. The obtained management file is transferred to the specified storage medium and recorded thereon.

In the above description, the conversion is performed when an instruction to transfer the stream is received. Alternatively, the recorder 500 may perform the conversion at any timing. For example, the recorder 500 may perform the conversion before such an instruction is received and retain the management file 1 and/or the management file 11, such that the transfer of the management file can be started immediately after the instruction is received. In the above description, the stream file is transferred before the management file is converted. Alternatively, the stream file may be transferred after the management file is converted, i.e., after step S226.

Owing to the above-described structure and procedure according to this embodiment, when a video stream recorded by the recorder 500 and the management information of the video stream are to be exported to another storage medium such as a memory card or the like, the management information can be converted without any need to record and analyze all the SOBUs in the video stream. Therefore, the conversion of the management file can be performed at high speed.

In this embodiment, the management file 21 includes the SOBU time length field 25 in the SOBU_ENT table 23. Instead of the SOBU time length field 25, the management file 21 may include the inter-I picture PTS difference field 15 shown in FIG. 16. When the inter-I picture PTS difference field 15 is included, the I-picture data size field 14 is stored in each SOBU_ENT table 23 together with the inter-I picture PTS difference field 15. The I-picture data size and the inter-I picture PTS difference are both information on the I picture of each SOBU.

Even when the inter-I picture PTS difference field 15 is included instead of the SOBU time length field 25, the SOBU time length can be easily obtained by transferring the first term of the right side of equation 1 to the left side and transferring the term of the left side to the right side.

In other embodiments, the management file may include the I-picture data size, the SOBU time length, the SOBU data size, and the inter-I picture PTS difference without storing the prior display picture number. Using values described in these fields, the post-conversion management file can be easily obtained.

It should be noted that the recorder 500 may transfer not only the stream file but also the management file 21 in importing/exporting data from/to a device with a 1394 interface. Additionally, the recorder 500 may convert format of the management file 21 to a predetermined one (e.g. a format of the management file 1 or the management file 21). In this case, the management file is required to be transferred in asynchronous transfer mode defined in 1394 standard.

Embodiment 7

In Embodiment 6, a stream file and a management file on an HDD or a phase change optical disc are exported to another HDD, another phase change optical disc or a memory card.

In Embodiment 7 of the present invention, a stream file and a management file are imported to an HDD, a phase change optical disc or a memory card. The data structure of the management file used in this processing is different from the data structure described in Embodiment 6. Hereinafter, a structure of an apparatus used for the import, the processing of the import, and a data structure of the management file used for the import will be described. The apparatus used in this embodiment can also perform the export described in Embodiment 6, which will not be repeated here.

The structure of the apparatus according to this embodiment is the same as that of the recorder 500 (FIGS. 18 and 19) and will not be described again. In the following description, the recorder 500 is used as the apparatus according to this embodiment.

The format converting section 510 reads a recorded stream file from the memory card drive section 550 and writes the stream file on an HDD or a phase change optical disc. The format converting section 510 also reads a management file recorded on a memory card and writes the management file on an HDD or a phase change optical disc after format conversion of the management file. The imported stream file and management information correspond to each other at 1:1.

Figure 24:
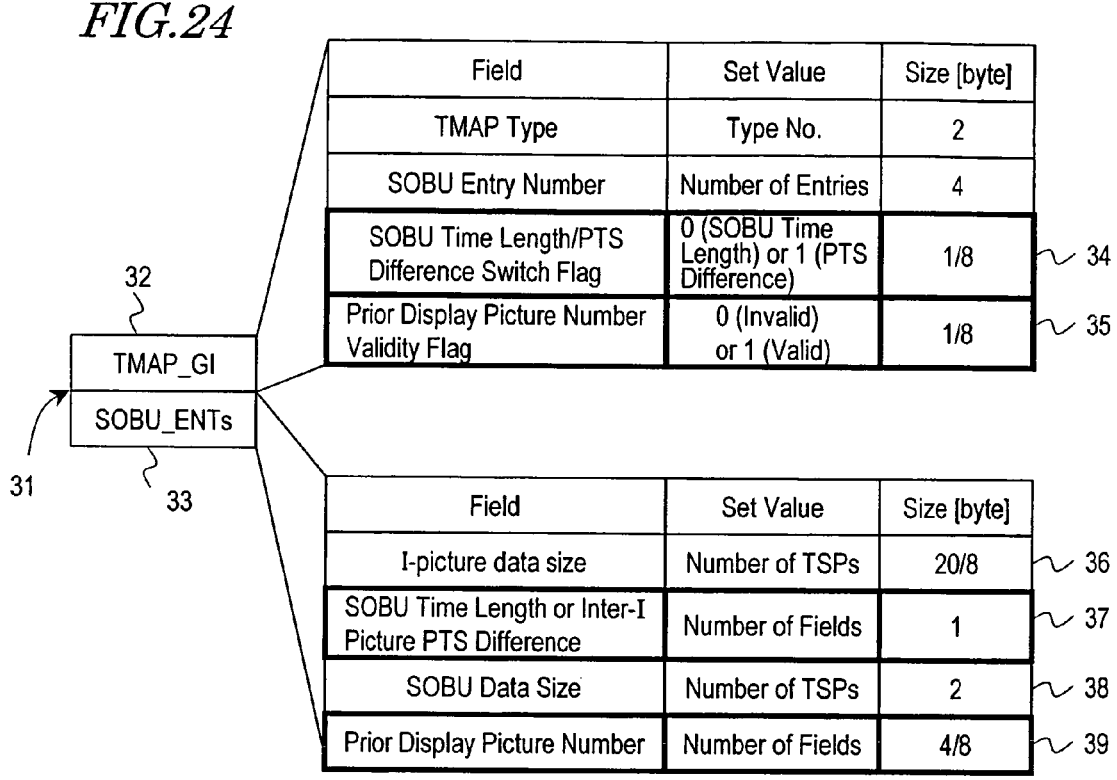
FIG. 24 shows a data structure of a management file according to Embodiment 7 of the present invention.

FIG. 24 shows a data structure of a management file 31 according to this embodiment.

Unlike the management file 21 in Embodiment 6, the management file 31 in this embodiment includes an "SOBU time length or inter-I picture PTS difference" field 37 in each SOBU_ENT table 33, instead of the SOBU time length field 25 in each SOBU_ENT table 23 (FIG. 20).

Also unlike the management file 21 in Embodiment 6, the management file 31 in this embodiment includes two flag fields 34 and 35 in the TMAP_GI table 32. In an SOBU time length/PTS difference switch lag field 34, a switch flag is described indicating which of the SOBU time length and the PTS difference is described in the field 37 of the SOBU_ENT table 33. In the prior display picture number validity flag field 35, a validity flag is described indicating whether or not the prior display picture number is recorded in the SOBU_ENT table 33. Each flag will be described in detail later. The fields of the management file 31 except for the above-identified fields (for example, fields 36, 38, etc.) are the same as the fields of the same names shown in FIG. 20.

At the time of self-encoding, the management information generating section 642 of the recording/reproduction section 540 describes the SOBU time length in the field 37. Based on an output from the MPEG encoder 670, the management information generating section 642 specifies the prior display picture number and sets the number in a prior display picture number field 39. At this point, the value of the switch flag of the field 34 in the TMAP_GI table 32 is set to 0. The value of the validity flag in the field 35 is set to 1. Such settings in the fields 34 and 35 show that the SOBU time length is described in the field 37 and that the prior display picture number is described in the field 39.

Figure 25:
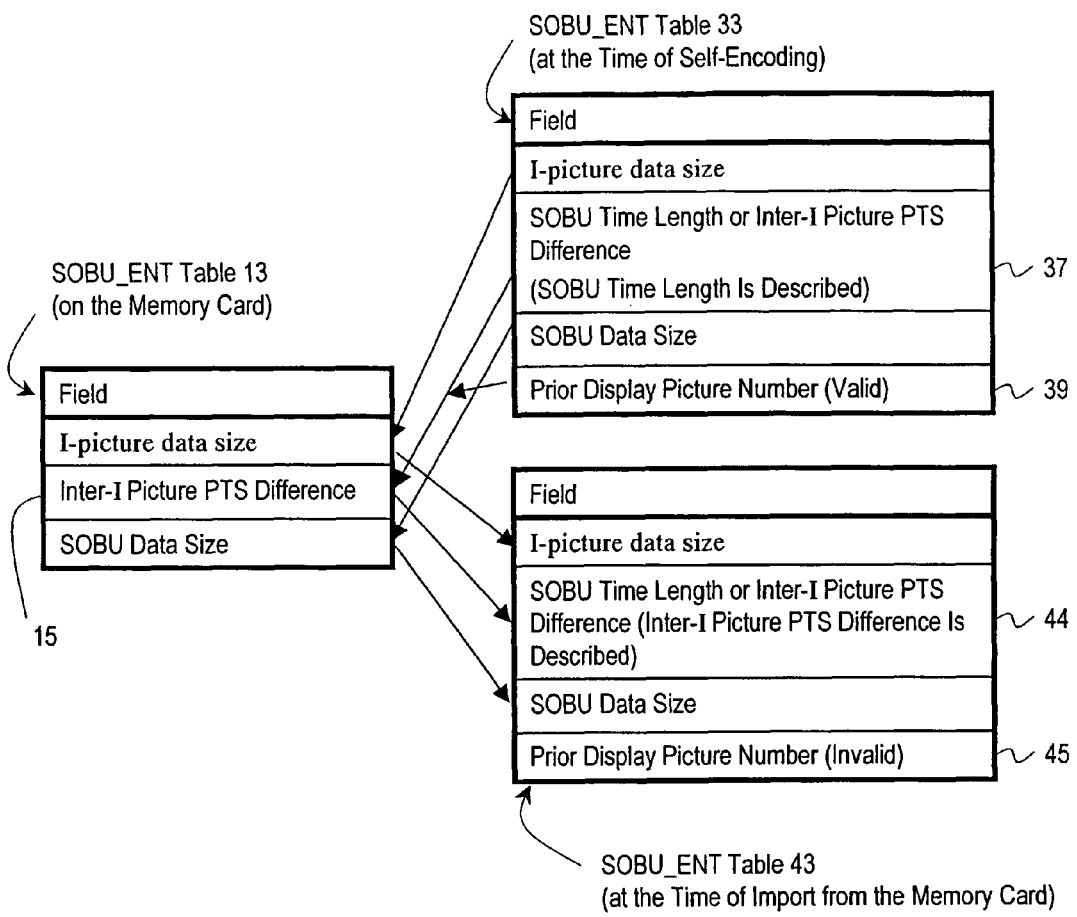
FIG. 25 shows the correspondence of the fields in the SOBU_ENT table of the management file between at the time of export to a memory card and at the time of import from a memory card.

FIG. 25 shows the correspondence of the fields in each SOBU_ENT table of the management file between at the time of export from the recorder 500 to a memory card and at the time of import from a memory card to the recorder 500. During the export, the SOBU_ENT table 33 of the management file at the time of self-encoding is converted into the SOBU_ENT table 13 by the format converting section 510. The value in the inter-I picture PTS difference field 15 of the management file on the memory card is obtained using both the value in the SOBU time length field 37 and the value in the prior display frame field 39 of the SOBU_ENT table 33.

During the import, the format converting section 510 converts the SOBU_ENT table 13 of the management file on the memory card into an SOBU_ENT table 43. The value in the inter-I picture PTS difference field 15 on the memory card is copied to an SOBU time length or inter-I picture PTS difference field 44. At this point, in the SOBU time length/PTS difference switch flag field 34 (FIG. 24), value 1 is selected and described, indicating that the PTS difference is described. In the prior display picture number validity flag field 35, value 0 is selected and described, indicating that the prior display picture number is invalid.

For reproducing a stream file recorded on an HDD or an optical disc, the recorder 500 according to this embodiment can determine a reproduction start point by referring to the management file regarding the stream. For example, for starting the reproduction of a stream from the start point at the 10th second counted from the start of the stream, it is necessary to specify the reproduction start point in the stream. The management file stores, in each SOBU, an SOBU time length or an inter-I picture PTS difference. Whichever may be described, the SOBU time length or the PTS difference, the reading control section 662 can specify the transport packet as the reproduction start point. The details are described above in Embodiment 6.

With the above-described structure, when importing a transport stream file and a management file thereof from an external element, the recorder 500 according to this embodiment can convert the management file without analyzing the stream. Also when exporting a transport stream file and a management file thereof to an external element, the recorder 500 according to this embodiment can convert the management file without analyzing the stream.

Thus, the import and export with a different type of storage medium such as a memory card or the like can be easily realized.

In this embodiment, an SOBU time length and a prior display picture number are recorded at the time of self-encoding. Alternatively, a PTS difference and a prior display picture number may be selected and recorded. Even if the management file corresponding to the apparatus to which the data is to be exported has a data structure including an SOBU time length field, the SOBU time length field can be easily calculated by the following equation 2.

The SOBU time length in SOBU_ENT table #j in the management file corresponding to such an apparatus=the PTS difference in the SOBU_ENT table #j at the time of self-encoding+the prior display picture number in the SOBU_ENT table #j at the time of self-encoding−the prior display picture number in the SOBU_ENT table #(j+1) at the time of self-encoding <Equation 2>

In this embodiment, either the SOBU time length or the PTS difference is selected and set in the management information. Alternatively, both the SOBU time length field and the PTS difference field may be included in each SOBU_ENT table.

Figure 26:
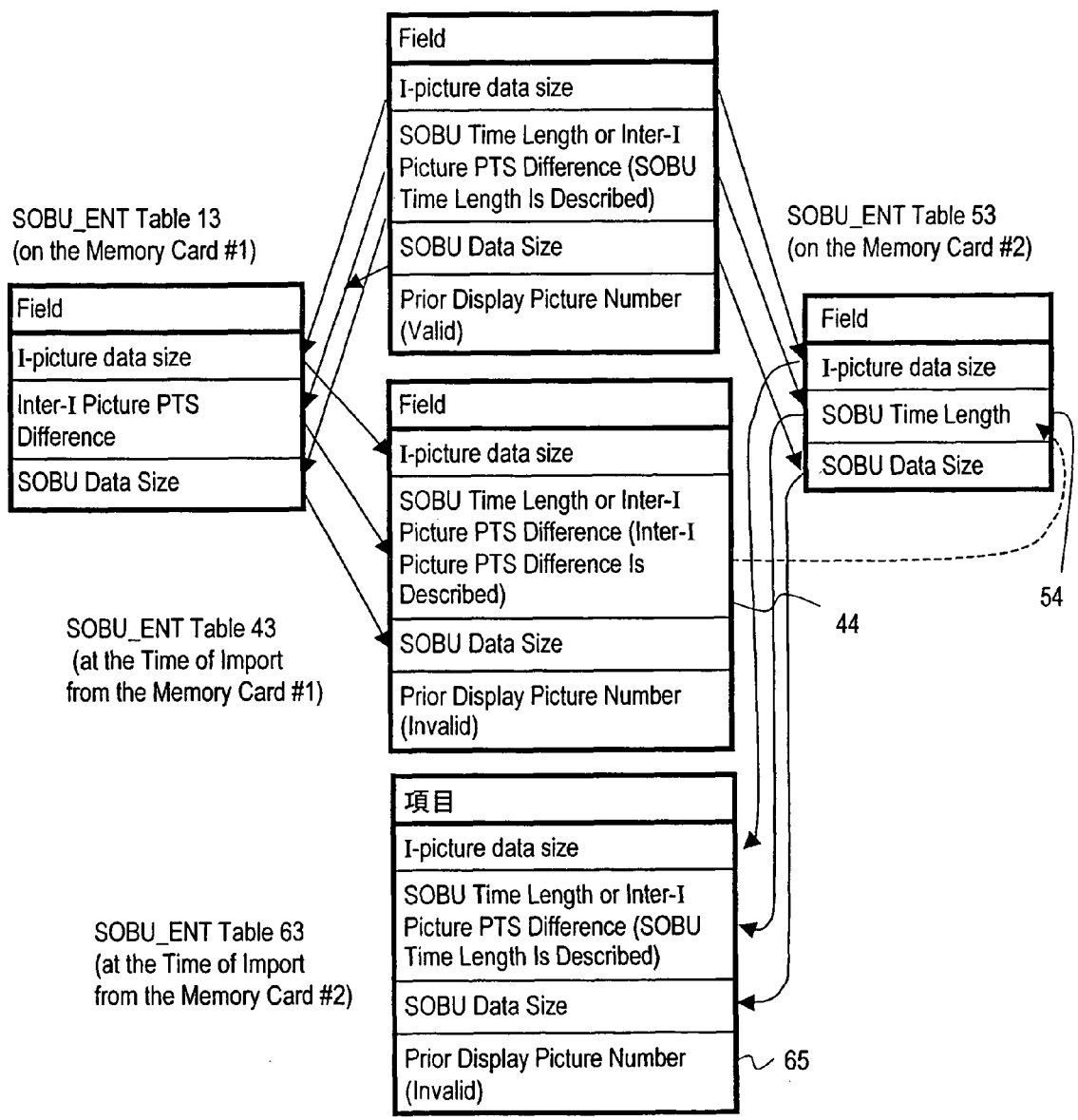
FIG. 26 shows the correspondence of the fields in the SOBU_ENT table of the management file among various types of recording mediums.

In this embodiment, the management information including the inter-I picture PTS difference is recorded on a memory card. Alternatively, a different data structure may be adopted in accordance with the type of memory card. For example, FIG. 26 shows the correspondence of the fields in the SOBU_ENT table of the management among at the time of export to a memory card #1, at the time of import from the memory card #1, at the time of export to a memory card #2, and at the time of import from the memory card #2. Like in FIG. 25, the SOBU_ENT table 13 of the management file on the memory card #1 includes an inter-I picture PTS difference field. A SOBU_ENT table 53 of the management file on the memory card #2 includes an SOBU time length field 54.

The recorder 500 can import a stream file and a management file which have been exported to the memory card #1 in FIG. 26 back to the recorder 500, and then export the stream file and the management file to the memory card #2. In this case, the information on the prior display picture number included in the management file before the management file was exported to the memory card #1 is lost. Therefore, after the stream file and the management file are exported to the memory card #2, the SOBU_ENT table 53 of the management file does not include the information on the prior display picture number.

If the information on the prior display picture number is to be recorded on the memory card #2, the format converting section 510 needs to analyze the transport stream and detect the SOBU time length of the management file. Alternatively, the recorder 500 may once record the stream file on the memory card #1 on the HDD and then decode the transport stream on the HDD for re-encoding. Since this processing is equivalent to self-encoding, the recorder 500 can generate the management information to be described in the management file. After this, the recorder 500 may store the transport stream and the management information on the memory card #2. As described above, fields of the management file can be newly generated concurrently with the re-encoding and stored as the management data of the memory card #2.

For dubbing a stream file and a management file from the memory card #2 to the memory card #1 via the HDD section 520 of the recorder 500, analysis processing or re-encoding processing equivalent to the above-described processing is required. When the files are imported from the memory card #2 to the recorder 500, the prior display picture number field is not present on the memory card #2. Therefore, value 0 is selected and described in the validity flag field 35 so that the value in a prior display picture number field 65 is invalid in the post-import management file.

In Embodiments 6 and 7, at the time of self-encoding, the MPEG encoder 670 generates data in the SOBU form. Alternatively, the MPEG encoder 670 may generate data in the VOBU form described in Embodiment 1. Namely, the first packet of the data may start with a PAT_TSP and a PMT_TSP like a VOBU.

In Embodiments 6 and 7, a transport stream is described as an MPEG system stream. Alternatively, the MPEG system stream may be a program stream. In this case, the I-picture data size and the SOBU data size need to be provided by the number of packs instead of the number of transport packets.

In Embodiments 6 and 7, MPEG system stream has been a transport stream. However the stream may be a QuickTime stream, Iso Based Media file stream, or MP4 file stream. Alternatively, the stream may be a stream part of the AVC file stream. As for the latter case, each field of the management file is stored by being mapped to each data field in the file header.

It should be noted that SOBU data size may be described as an address value reckoned from the top of the stream with a value "0".

In Embodiments 6 and 7, the format converting section 510 converts management information but does not convert a stream file. Alternatively, the format converting section 510 may convert a stream file when necessary.

In Embodiments 6 and 7, a stream file and a management file thereof are first recorded on a phase change optical disc or an HDD. Alternatively, the stream file and the management file may be first recorded on a semiconductor memory. In this case, the recorder first copies the stream onto a phase change optical disc or to a memory, and further converts the management file.

In Embodiments 6 and 7, the stream includes audio data. Alternatively, the stream does not need to include audio data. The management information includes none of the PAT/PMT pointer, the TSP arrival time, and the time length validity flag described in Embodiment 2. Alternatively, such information may be included when necessary.

In Embodiments 6 and 7, TMAP_GI may have an absolute PTS value of an I frame located at the first SOBU. Thus, an absolute PTS value for a specified frame can be derived based on the derived absolute PTS value and the PTS difference. By using the absolute value of PTS, presentation start point can be precisely controlled in MPEG decoder.

In Embodiments 6 and 7, each data field in the SOBU_ENT may be provided as one independent table from each other. Each table is stored in an independent management file, for example, and makes up management information.

Alternatively, only the prior display picture number field may be provided as single table, for example. According to this example, data structure of the management file in Embodiment 6 and 7 is similar to that of management file 11, thus compatibility between management files is improved.

In the above embodiments, a stream and management information thereof are recorded on a storage medium via a drive built in the recorder. Alternatively, the stream and the management information may be recorded on a storage medium via a drive device connected to the recorder via a network.

In the above embodiments, the UDF file system is used as the optical disc file system. Alternatively, the optical disc file system may be the NTFS, FAT, UFS (Unix File System) or other systems. The 1394 interface is described as the digital interface. Alternatively, USB2.0, HDMI, or other digital interfaces may be used.

In the above embodiments, in conformity with the MPEG-2 video standard, the term "picture" refers to one progressive video frame, a set of two interfaced video fields of top field and bottom field, or one interlaced video field. This picture corresponds to, for example, a video project plane (VOP) of the MPEG-4 standard.

In the above embodiments, a phase change optical disc is used as a storage medium, but the present invention is not limited to this. The storage medium may be, for example, an optical disc such as a DVD-RAM disc, an MO disc, a DVD-R disc, a DVD−RW disc, a DVD+RW disc, a CD-R disc, a CD-RW disc or the like; a disc-shaped storage medium such as a hard disc or the like; or a non-disc-shaped storage medium such as a memory card. The storage medium may be a semiconductor memory such as a flash memory, an MRAM, an FeRAM or the like. A pickup is used as a reading/writing head. Alternatively, in the case where the storage medium is an MO disc, the reading/writing head is a combination of a pickup and a magnetic head, whereas in the case where the storage medium is a hard disc, the reading/writing head is a magnetic head.

It should be noted that each functional block shown in FIG. 19 and so on, is typically realized as one or more large scale integrated circuit (LSI) chips. Each block may be realized in an independent chip, or a part or all blocks may be integrated in one chip. For example, the encoder 670 and the management information generating section 642 are integrated in one chip and implemented in the recording/reproduction section 540. The chip instructs the HDD drive section 520, the optical disc drive section 530 and/or memory card drive section 550 to write the data stream and the management information on the storage medium.

Alternatively, the encoder 670 and the decoder 671 may be integrated in one chip, and the management information generating section 642 in another chip. In this case, the management information generating section 642 is implemented as a specialized processor, a general-purpose processor, or the like. The each processor executes a computer program to realize the above described function of the management information generating section 642.

In the above embodiments, the size of one logical block is 32 kilobytes and the size of one sector is 2 kilobytes. The sizes of the logical block and the sector are not specifically limited as long as the size of the logical block is a value obtained by multiplying the size of the sector by an integer. For example, the size of one logical block may be 16 kilobytes and the size of one sector may be 2 kilobytes. The size of one logical block and the size of one sector may both be 2 kilobytes.

In the above embodiments, a compressed video code and a compressed audio code are respectively an MPEG-2 compressed video code and an AAC compressed audio code. Alternatively, these codes may be, for example, an MPEG-1 compressed video code, an MPEG-4 compressed video code, an MPEG-4 AVC code (H.264 code), an MPEG-Audio compressed code, a Dolby AC3 compressed code, or a Twin-VQ compressed code.

It should be noted that, in the examples shown in FIGS. 25 and 26, the processor generates information for the item(s) within the SOBU_ENT table in accordance with the type of the storage medium. However, the processor can generate the information in accordance with only the recording format of the storage medium, or in accordance with the type and the recording format of the storage medium.

In the above embodiments, the transmission timing to transmit a transport stream is determined by the output timing generating section. Alternatively, the transmission timing of the transport packet which is output by the system encoding section 104 may be recorded when the transport packet is recorded, so that this transmission timing can be used for transmitting the transport stream via the 1394 interface section. This can be realized by, for example, recording the transmission timing of 4 byte data immediately before the transport packet and thus recording the data in the form of a packet of 192 bytes in total. In this case, SOBU data length is counted in numbers of the packet of 192 bytes.

Alternatively, a plurality of pieces of transmission timing information may be stored in a transport packet dedicated for storage of transmission timing information, and a transport packet corresponding to the transmission timing may be recorded immediately after the dedicated transport packet. In this case, the data size of the packet remains 188 bytes.

In the above embodiments, the management information of a stream is described based on the assumption that the stream is continuous. Alternatively, the stream may have time stamps such as a PCR, a PTS, transmission timing information or the like which are discontinued at a predetermined packet. In this case, the management information can be managed and recorded by the unit of the range in which the stream is continuous.

A recorder (data processing apparatus) according to the present invention operates based on a computer program providing the procedures shown in FIG. 22 and FIG. 23. A computer in the data processing apparatus (for example, a CPU) can execute such a computer program to operate the elements in the apparatus and thus realize the above-described processing. A computer program is recorded on a storage medium such as a CD-ROM or the like and distributed on a market as a product, or transferred as a product via an electronic communication line such as the Internet or the like. In this manner, a computer system can be operated as an apparatus having functions equivalent to those of the above-described data processing apparatus.

As described above, the present invention provides a data processing apparatus capable of realizing the processing of importing a video stream and management information recorded on an external storage medium or the processing of exporting a video stream and management information to an external storage medium at high speed.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2004-297435 filed on Oct. 12, 2004 and No. 2005-294700 filed on Oct. 7, 2005, the entire contents of which are hereby incorporated by reference.

What is claimed is:

1. A data processing apparatus, comprising:
    an encoder for encoding a video signal to generate a data stream;
    a processor for generating management information for reproducing video from the data stream; and
    a drive for writing the data stream and the management information on a storage medium;
    wherein the encoder generates a plurality of reproduction units each including data of a basic picture capable of being decoded independently, data of at least one reference picture required to be decoded from the basic picture, and time information indicating a reproduction time to reproduce each of the pictures, aligns the plurality of reproduction units and thus generates the data stream, wherein the processor generates, in accordance with type and recording format of the recording medium, one of basic picture information and reproduction unit information, and time length information, and stores each generated information in one or more tables of the respective reproduction units as management information, wherein the basic picture information defines a correspondence between a reproduction time to reproduce the first basic picture which is recorded at the top of the each reproduction unit, and a recording position of the basic picture based on the order of writing pictures of the data stream on the recording medium, where the reproduction time to reproduce the first basic picture is described by means of the time information of the first basic picture, wherein the reproduction unit information defines a correspondence between a reproduction time length of each reproduction unit and a recording position of the basic picture, and wherein the time length information relates to the reproduction time length on N number of pictures which are displayed before the first basic picture in each reproduction unit, where N is an integer equal to or more than zero.

2. The data processing apparatus of claim 1,
wherein an order in which the data of the pictures is arranged is different from an order in which the pictures are displayed due to the encoding, wherein the encoder outputs information specifying at least one reference picture, the data of which is arranged after the first basic picture in each reproduction unit and is displayed before the first basic picture, and wherein the processor generates the time length information on the reproduction time length of the specified at least one reference picture, and stores the time length information in the one or more tables of the respective reproduction units.

3. The data processing apparatus of claim 1, wherein the processor generates a first flag specifying one of the basic picture information and the reproduction unit information, and generates a second flag indicating that the time length information is stored, and stores the first flag and the second flag in the one or more tables of the respective reproduction units.

4. The data processing apparatus of claim 1, further comprising a converting section for converting a format of the management information;
wherein when the processor generates the basic picture information, the converting section further generates the reproduction unit information based on the basic picture information and the time length information.

5. The data processing apparatus of claim 4, wherein the converting section replaces the reproduction unit information with the basic picture information to generate new management information.

6. The data processing apparatus of claim 5, further comprising an interface section for performing data communication with an external device;
wherein the interface section outputs the new management information and the data stream to the external device.

7. The data processing apparatus of claim 1, further comprising a converting section for converting a format of the management information;
wherein when the processor generates the reproduction unit information, the converting section further generates the basic picture information based on the reproduction unit information and the time length information.

8. The data processing apparatus of claim 7, wherein the converting section replaces the basic picture information with the reproduction unit information to generate new management information.

9. The data processing apparatus of claim 8, further comprising an interface section for performing data communication with an external device;
wherein the interface section outputs the new management information and the data stream to the external device.

10. A data processing method for writing a data stream of video and management information for reproducing the video from the data stream on a storage medium, comprising the steps of:
encoding a video signal to generate a plurality of reproduction units each including data of a basic picture capable of being decoded independently, data of at least one reference picture required to be decoded from the basic picture, and time information indicating a reproduction time to reproduce each of the pictures;
aligning the plurality of reproduction time units to generate the data stream;
generating, in accordance with type and recording format of the recording medium, one of basic picture information and reproduction unit information, and time length information;
storing each generated information in one or more tables of the respective reproduction units as management information; and
writing the data stream and the management information on the storage medium,
wherein the basic picture information defines a correspondence between a reproduction time to reproduce the first basic picture which is recorded at the top of the each reproduction unit, and a recording position of the basic picture based on the order of writing pictures of the data stream on the recording medium, where the reproduction time to reproduce the first basic picture is described by means of the time information of the first basic picture,
wherein the reproduction unit information defines a correspondence between a reproduction time length of each reproduction unit and a recording position of the basic picture, and
wherein the time length information relates to the reproduction time length on N number of pictures which are displayed before the first basic picture in each reproduction unit, where N is an integer equal to or more than zero.

11. A circuit chip comprising:
an encoder for encoding a video signal to generate a data stream; and
a processor for generating management information for reproducing video from the data stream,
the circuit chip instructing a drive to write the data stream and the management information on the storage medium,
wherein the encoder generates a plurality of reproduction units each including data of a basic picture capable of being decoded independently, data of at least one reference picture required to be decoded from the basic picture, and time information indicating a reproduction time to reproduce each of the pictures, aligns the plurality of reproduction units and thus generates the data stream, wherein the processor generates, in accordance with type and recording format of the recording medium, one of basic picture information and reproduction unit information, and time length information, and stores each generated information in one or more tables of the respective reproduction units as management information, wherein the basic picture information defines a correspondence between a reproduction time to reproduce the first basic picture which is recorded at the top of the each reproduction unit, and a recording position of the basic picture based on the order of writing pictures of the data stream on the recording medium, where the reproduction time to reproduce the first basic picture is described by means of the time information of the first basic picture, wherein the reproduction unit information defines a correspondence between a reproduction time length of each reproduction unit and a recording position of the basic picture, and wherein the time length information relates to the reproduction time length on N number of pictures which are displayed before the first basic picture in each reproduction unit, where N is an integer equal to or more than zero.

12. A non-transitory computer readable storage medium storing a computer program executable by a computer and used for generating a data stream of video and management information for reproducing the video from the data stream, wherein the computer program causes the computer to execute the steps of:

encoding a video signal to generate a plurality of reproduction units each including data of a basic picture capable of being decoded independently, data of at least one reference picture required to be decoded from the basic picture, and time information indicating a reproduction time to reproduce each of the pictures;

aligning the plurality of reproduction time units to generate the data stream;

generating, in accordance with type and recording format of the recording medium, one of basic picture information and reproduction unit information, and time length information;

storing each generated information in one or more tables of the respective reproduction units as management information; and writing the data stream and the management information on the storage medium, wherein the basic picture information defines a correspondence between a reproduction time to reproduce the first basic picture which is recorded at the top of the each reproduction unit, and a recording position of the basic picture based on the order of writing pictures of the data stream on the recording medium, where the reproduction time to reproduce the first basic picture is described by means of the time information of the first basic picture, wherein the reproduction unit information defines a correspondence between a reproduction time length of each reproduction unit and a recording position of the basic picture, and wherein the time length information relates to the reproduction time length on N number of pictures which are displayed before the first basic picture in each reproduction unit, where N is an integer equal to or more than zero.

* * * * *